US009598287B2

(12) United States Patent
Awadallah-F et al.

(10) Patent No.: US 9,598,287 B2
(45) Date of Patent: Mar. 21, 2017

(54) METHOD OF SYNTHESIZING CARBON NANORODS AND NANOWIRES

(71) Applicant: QATAR UNIVERSITY, Al Tarfa, Doha (QA)

(72) Inventors: Ahmed Awadallah-F, Cairo (EG); Shaheen A. Al-Muhtaseb, Doha (QA)

(73) Assignee: Qatar University, Doha (QA)

( * ) Notice: Subject to any disclaimer, the term of this patent is extended or adjusted under 35 U.S.C. 154(b) by 0 days.

(21) Appl. No.: 14/288,315

(22) Filed: May 27, 2014

(65) Prior Publication Data
US 2015/0344310 A1 Dec. 3, 2015

(51) Int. Cl.
*C01B 31/02* (2006.01)
*C01B 31/00* (2006.01)

(52) U.S. Cl.
CPC .......... *C01B 31/0293* (2013.01); *C01B 31/00* (2013.01); *C01P 2004/136* (2013.01); *Y10T 428/2918* (2015.01)

(58) Field of Classification Search
CPC .......... C01B 31/0293; B82Y 5/00; D01F 9/10
USPC ........ 423/447.1–447.3, 445 B; 977/742–754, 977/842–848; 428/367
See application file for complete search history.

(56) References Cited

U.S. PATENT DOCUMENTS

| 8,173,211 | B2 | 5/2012 | Shaffer et al. | |
| 2007/0048521 | A1* | 3/2007 | Istvan | D01F 9/20 |
| | | | | 428/367 |
| 2011/0024698 | A1* | 2/2011 | Worsley | B82Y 30/00 |
| | | | | 252/511 |

FOREIGN PATENT DOCUMENTS

| CN | 101792119 A | 8/2010 |
| CN | 101798077 A | 8/2010 |

OTHER PUBLICATIONS

Zussman, et al., Mechanical and structural characterization of electrospun PAN-derived carbon nanofibers, Carbon 2006; 43: 2175-2185.*

* cited by examiner

*Primary Examiner* — Daniel C McCracken
(74) *Attorney, Agent, or Firm* — Squire Patton Boggs (US) LLP

(57) ABSTRACT

The method of synthesizing carbon nanorods (CNRs) and carbon nanowires (CNWs) involves carbonization of a resorcinol-formaldehyde cross-linked precursor gel. The first stage is the synthesis of resorcinol-formaldehyde cross-linked precursor gel. The second stage is carbonization of the gel by heating the gel in a furnace under the flow of nitrogen gas at 500° C. for three hours. The third stage involves activating the carbon by heating the carbon gel in a furnace under the flow of carbon dioxide gas for one hour at 700° C. to form the CNRs and CNWs.

16 Claims, 24 Drawing Sheets

METHOD OF SYNTHESIZING CARBON NANORODS AND NANOWIRES

BACKGROUND OF THE INVENTION

1. Field of the Invention

The present invention relates to a simple novel process for producing nanostructures, and particularly to a method of synthesizing carbon nanorods (CNRs) and nanowires (CNWs) through the use of cross-linked resorcinol-formaldehyde gel as a precursor.

2. Description of the Related Art

Since the discovery of the $C_{60}$ buckminsterfullerene molecule, there has been much interest in the field of carbon nanorods (CNRs) and carbon nanowires (CNWs). The explosion in $C_{60}$ research in the early 1990s was driven by the production of large quantities (which was in the order of few milligrams) of this material using a high pressure arc discharge method. A nanowire refers to a wire having a diameter typically in the range of about 1 nm to about 500 nm. Nanowires, such as small-sized CNTs (carbon nanotubes) on the order of 1-100 nm in diameter and 0.1-100 microns in length, have received considerable attention in recent years. Nanowires are solid structures, which can have an amorphous, graphite or a herringbone structure. Nanowires are periodic only along their axes, and therefore they can assume any energetically favorable order in other planes, resulting in a lack of crystalline order.

The dimensions of nanoparticles, located between those of molecules and conventional microelectronics, allow mimicking of nature's efficient ways of managing with less when it comes to chemical and physical processing. Nanorods can be used in various fields, such as catalysts, medicine and pharmaceuticals, electronic devices, nanoelectronics, nanophotonics, ceramic materials, pigments and cosmetics industry. The U.S. has invested more than $8 billion in nanotechnology research and development since the year 2000, and the National Science Foundation (NSF) estimates the global market for nanotechnology products will be about $1 trillion by 2015. In its 2007 strategic plan, the National Nanotechnology Initiative, which oversees U.S. nanotechnology research spending, pointed to the critical need for synthesis and processing techniques that yield high-quality, pure nanomaterials. The global markets of nanotechnology are vast in general and still virgin for nanorods and nanowires in particular.

So far, various methods have been demonstrated for the synthesis of CNRs and CNWs, which include the arc discharge method, chemical vapor deposition/template methods, electron beam-induced route, and catalytic copyrolysis method. One technique for fabricating nanowires utilizes a micro lithographic process followed by metal organic chemical vapor deposition (MOCVD). This technique may be used to generate a single quantum wire or a row of gallium arsenide (GaAs) quantum wires embedded within a bulk aluminum arsenide (AlAs) substrate. One problem with this technique, however, is that micro-lithographic processes and MOCVD have been limited to GaAs and related materials.

Moreover, this technique does not result in a high degree of size uniformity of the wires suitable for practical applications. Another method of fabricating nanowires involves using a porous substrate as a template and filling naturally occurring arrays of nano-channels or pores in the substrate with a material of interest. However, it is difficult to generate relatively long continuous wires having relatively small diameters because as the pore diameters become small, the pores tend to branch and merge. As a result, the small and long pores present difficulties in filling the tube with the desired filling material.

Unlike nanowires, CNTs are hexagonal networks of carbon atoms forming hollow, seamless tubes with each end capped with half of a fullerene molecule. They were first produced as multi-layer concentric tubes or multi-walled CNTs by evaporating carbon in an arc discharge. Presently, there are three main approaches for the synthesis of single and multi-walled CNTs. These include the electric arc discharge of graphite rod, the laser ablation of carbon, and the chemical vapor deposition of hydrocarbons. Unfortunately, these methods are not suitable for the production of nanowires, especially for commercial investment. Besides, CNRs or CNWs are obtained from the above methods as byproducts of CNTs, rather than as the primary product. As such, these methods are considered indirect methods for preparing CNRs or CNWs. Therefore, there is a dire need for a convenient and simple method for synthesizing CNRs and CNWs.

Thus, a method of synthesizing carbon nanorods and nanowires solving the aforementioned problems is desired.

SUMMARY OF THE INVENTION

The method of synthesizing carbon nanorods and nanowires involves carbonization of a resorcinol-formaldehyde cross-linked precursor gel. The first stage is the synthesis of resorcinol-formaldehyde cross-linked precursor gel. The second stage is carbonization of the gel by heating the gel in a furnace under the flow of nitrogen gas at 500° C. for three hours. The third stage involves activating the carbon by heating the carbon gel in a furnace under the flow of carbon dioxide gas for one hour at 700° C. to form the CNRs and CNWs. Specifically, the method of synthesizing carbon nanorods and carbon nanowires comprises: (a) providing resorcinol/formaldehyde gel samples inside a furnace; (b) maintaining the furnace at room temperature while continuously purging the furnace with an inert gas; (c) heating the furnace at a rate of 5° C. per minute up to a temperature of 500° C. and maintaining this temperature for about 3 hours while continuously purging the furnace with the inert gas; (d) cooling the samples down to room temperature thereby producing carbon gel; (e) flowing $CO_2$ gas into the furnace; (f) heating the carbon gel at a rate of 7° C. up to 700° C. and maintaining this temperature for at least an 1 hour while continuously flowing $CO_2$ gas, thereby activating the carbon gel and completing formation of carbon nanorods and/or carbon nanowires. The formed CNRs and CNWs are characterized by unique lengths and diameters These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
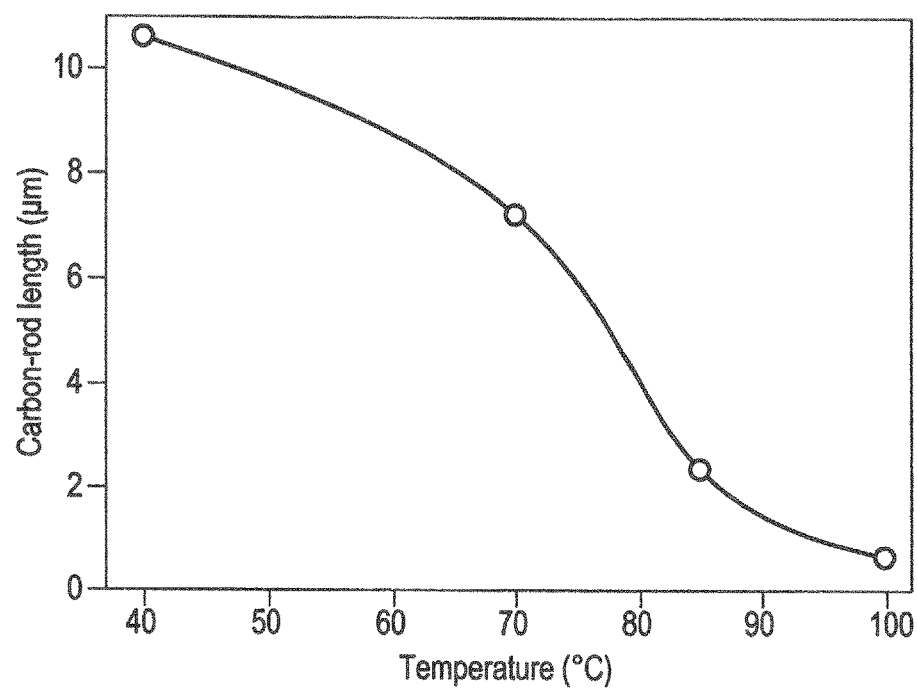
FIG. 1A is a graph depicting the effect of the gel curing temperature on the average length of the final resulting CNRs in a method of synthesizing carbon nanorods and carbon nanowires according to the present invention.

The method of synthesizing carbon nanorods and nanowires involves carbonization of a resorcinol-formaldehyde cross-linked precursor gel. The first stage is the synthesis of resorcinol-formaldehyde cross-linked precursor gel. The second stage is carbonization of the gel by heating the gel in a furnace under the flow of nitrogen gas at 500° C. for three hours. The third stage involves activating the carbon by heating the carbon gel in a furnace under the flow of carbon dioxide gas for one hour at 700° C. to form the CNRs and CNWs.

Described below are exemplary methods to produce the carbon nanorods (CNRs) and carbon nanowires (CNWs) using cross-linked resorcinol/formaldehyde gel as a precursor.

As used herein the term "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include nanowires, nanorods and nanotubes. A nanowire refers to a wire having a diameter typically in the range of about 1 to 500 nm. Carbon nanowires (CNWs) are allotropes of carbon with a cylindrical nanostructure (i.e., rod-shaped material), having a diameter measuring on the nanometer scale as described above. Carbon nanorod is meant a nanoscale cylindrical carbon structure with at least one characteristic dimension less than about 100 microns, which is typically in the nanometer range.

Example 1

Synthesis of Resorcinol/Formaldehyde Gel

Resorcinol and the catalyst sodium carbonate ($Na_2CO_3$) were weighed and mixed with ultrapure water in Erlenmeyer flasks and stirred magnetically until resorcinol and $Na_2CO_3$ were completely dissolved with clear solution. Thereafter, a specified quantity of formaldehyde solution was added to the dissolved reactants. Then, the pH level of the reaction medium was adjusted to a neutral value (i.e., pH=7.0) by using few droplets of diluted nitric acid and/or ammonium hydroxide solutions. The resulting solutions were poured into polypropylene vials, sealed and placed in an oven at variable curing temperatures in the range of 40° C. to 100° C.±1° C. for 7 days. In order to prevent the dehydration of the formed gel and to increase their crosslinking density, 2% acetic acid was poured upon the gel surface after their partial solidification. The vials were removed from the oven and allowed to cool down spontaneously to room temperature. The remnant solutions above the completely cross-linked gel was hereinafter decanted and exchanged with acetone at room temperature. The gel was left tightly sealed in acetone at room temperature overnight, and the remaining acetone is replaced in the following day with fresh acetone. This solvent exchange process is repeated for 3 days. After the third day of solvent exchange process, the completely cross-linked gel and the accompanying fresh acetone were incubated in an oven at 50° C.±1° C. and kept for another two days to dry at that condition.

To study the effect of resorcinol concentration on the growth of resorcinol-formaldehyde activated carbon gel nanorods, the concentration of resorcinol was varied while the other parameters were held constant. The studied range of resorcinol-to-water was between 0.12 to 1.85 g/ml water while keeping other parameters (such as temperature and concentrations of catalyst and formaldehyde solution) fixed at certain values. The amounts of $Na_2CO_3$ and formaldehyde solution are fixed at 8.90 mg/ml water and 1.10 ml/ml water, respectively. In addition, the curing temperature used in this experiment is fixed at 70° C.±1° C. The concentration of resorcinol-to-water was varied in the range of about 0.12 to about 1.85 g/ml water. The respective concentrations of resorcinol and the fixed proportion of $Na_2CO_3$ (i.e., 8.90 mg/ml water) were weighted according to aforementioned concentrations and mixed with ultrapure water in Erlenmeyer flasks and then stirred magnetically until resorcinol and $Na_2CO_3$ are completely dissolved with clear color solution in each sample. Thereafter, a fixed quantity of formaldehyde solution (i.e., 1.10 ml/ml water) was added to the dissolved reactants. Then, pH levels of reaction media were adjusted to a neutral value (i.e., 7.0) by using few droplets of diluted nitric acid and/or ammonium hydroxide solutions. The resulting solutions were then poured into polypropylene vials equipped with screw-type covers, tightly sealed and placed in an oven at a curing temperature of 70° C.±1° C. for 7 days. In order to prevent the dehydration of the formed gel, and to increase their cross-linking density in the same time, 2% acetic acid solution was poured upon the gel's surface after their partial solidification. Then, the vials were removed from the oven and allowed to cool down spontaneously to room temperature. The remnant solutions above the completely cross-linked gels were hereinafter decanted and exchanged with acetone at room temperature. The gels were left tightly sealed in acetone at room temperature overnight, and the remaining acetone is replaced on the following day with fresh acetone. This solvent exchange process is repeated for 3 days. After the third day of solvent exchange process, the completely cross-linked gel and the accompanying fresh acetone were incubated in an oven at 50° C.±1° C., and kept for another two days to dry at that condition.

The effect of catalyst ($Na_2CO_3$) concentration on the growth of carbon nanorods was studied in the range of 2.23 to 35.6 mg/ml water, while other parameters are fixed at certain values. The fixed amounts of resorcinol and formaldehyde were 462 mg/ml water and 1.10 ml/ml water, respectively. The fixed curing temperature exploited here is 70° C.±1° C. The concentration of $Na_2CO_3$ to water was varied in the range of −2.23 to −35.6 mg/ml water. Furthermore, these different concentrations of $Na_2CO_3$ and a fixed amount of resorcinol (i.e., 462 mg/ml water) were weighted according to aforementioned concentrations and mixed with ultrapure water in Erlenmeyer flasks and then stirred magnetically until resorcinol and $Na_2CO_3$ are completely dissolved with clear color of solution in each sol sample. Thereafter, a fixed quantity of formaldehyde solution (i.e., 1.10 mg/ml water) was added to the dissolved reactants. Then, pH level of reaction medium was adjusted to a neutral value (i.e., 7.0) by using few droplets of diluted nitric acid and/or ammonium hydroxide solutions. Resulting solutions were then poured into polypropylene vials equipped with screw-type covers, tightly sealed, and placed in an oven at a curing temperature is of 70° C.±1° C. for 7 days. In order to prevent the dehydration of the formed gel, and to increase their crosslinking density in the same time, 2% acetic acid was poured upon the gel's surfaces after their partial solidification. Then, the vials were removed from the oven and allowed to cool down spontaneously to room temperature. The remnant solutions above the completely formed gels were hereinafter decanted and exchanged with acetone at room temperature. The gel was left tightly sealed in acetone at room temperature overnight, and the remaining acetone is replaced on the following day with fresh acetone. This solvent exchange process is repeated for 3 days. After the third day of solvent exchange process, the completely cross-linked gel and the accompanying fresh acetone were incubated in an oven at 50° C.±1° C. and kept for two more days to dry at that condition.

Example 2

Synthesis of Carbon Nanorods (CNRs) and Carbon Nanowires (CNWs)

Samples of dried resorcinol-formaldehyde gels that were prepared by the above process were placed in a ceramic boat inside a programmable electric-heated tube furnace (Nabertherm GmbH), while flowing nitrogen gas continuously with a flow rate of about 100 cm$^3$/min. The furnace was first maintained at room temperature for 45 minutes to make sure that air is completely purged with the flowing nitrogen gas. Thereafter, the furnace was heated with a rate of 5° C./min up to a temperature of 500° C. Further, the furnace was maintained at this temperature for 3 hours while purging continuously with nitrogen gas, and then allowed to cool down spontaneously to room temperature while flowing the nitrogen gas continuously. The resulting samples are denoted as carbon gel. Each resulting carbon gel was then activated in the same furnace with $CO_2$ gas (instead of nitrogen gas) flowing continuously with a flow rate of about 150 cm$^3$/min, heating the carbon gel sample again with a rate of 7° C./min to 700° C., maintaining this temperature for 1 h while flowing $CO_2$ gas, and then the sample was allowed to cool down spontaneously to room temperature while still flowing $CO_2$ gas with the same flow rate. After cooling down to room temperature, the sample was collected as activated carbon gel, which consists of CNRs and CNWs.

The surface area of resorcinol-formaldehyde CNR sample was measured using the adsorption/desorption isotherms of nitrogen gas at 77 K via a Micromeritics ASAP 2420® accelerated surface area and porosity technique with an enhanced micropore capability (utilizing a 1-Torr pressure transducer to increase precision in the microporous range) along with the density functional theory (DFT). Prior to adsorption/desorption measurements, the CNR or CNW sample was regenerated at in situ conditions; 12 h at 150° C. under a high vacuum ($1 \times 10^{-6}$ mbar). The morphology of resorcinol-formaldehyde CNRs or CNWs was observed with a FEI Nova™ Nano Scanning Electron Microscope 450 (NovaNanoSEM).

Figure 1B:
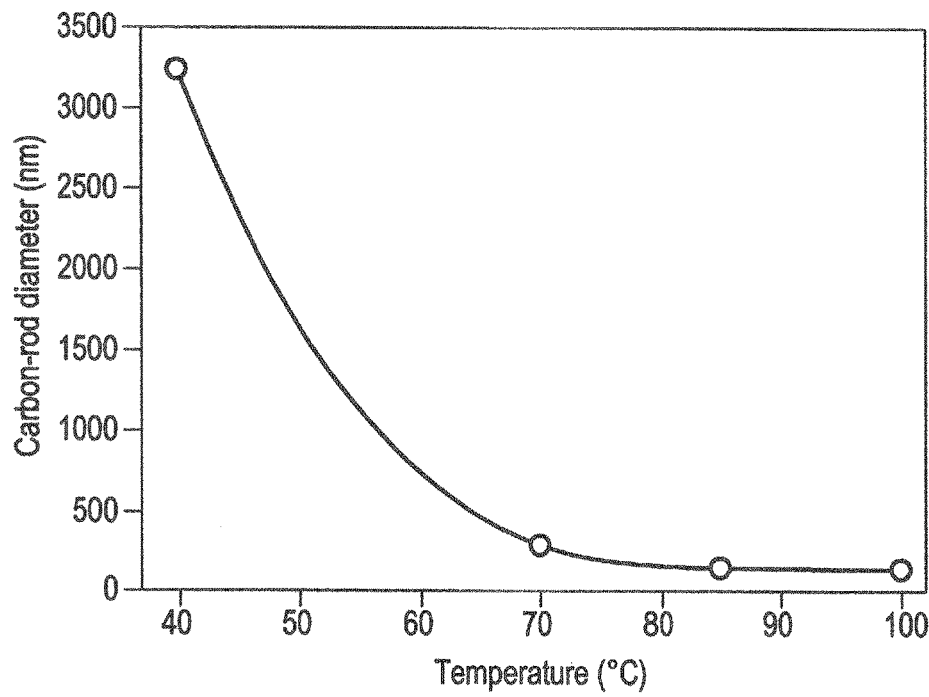
FIG. 1B is a graph depicting the relationship between the gel curing temperature on the average diameter of the CNRs in a method of synthesizing carbon nanorods and carbon nanowires according to the present invention.

FIGS. 1A and 1B generally depicts the effect of the gel curing temperature during the initial synthesis of resorcinol-formaldehyde gel on the average lengths (FIG. 1A) and diameters (FIG. 1B) of the final resulting CNRs after activation thereof. It is noteworthy that the amounts of resorcinol, catalyst ($Na_2CO_3$) and formaldehyde were fixed in the initial solution of gel synthesis at 462 mg/ml water, 8.90 mg/ml water and 1.10 mg/ml water, respectively. FIG. 1A shows that the growth of CNR average length increased with increasing curing temperature in a smooth gradient pattern. Further, for the studied curing temperature range of 40° C.±1° C. to 100° C.±1° C., the corresponding CNR average lengths were in the range of 10.58 to 0.61 microns.

Further, from FIG. 1A it is observed that the curve is divided into three regions. In the first region, a moderate decrease of CNR average length of 10.58 to 7.20 microns was exhibited for the corresponding curing temperature range of 40° C.±1° C. to 70° C.±1° C. In the second region, the CNR average length diminished relatively rapidly from 7.20 to 2.31 microns in the corresponding curing temperature range of 70° C.±1° C. to 85° C.±1° C., followed in the third region by a gradient decrement of CNR average lengths of 2.31 to 0.61 microns for the corresponding curing temperature range is of 85° C.±1° C. to 100° C.±1° C. Overall, the first and third regions have a similar rate of CNR average length diminishment with temperature (0.113 microns/° C.), whereas CNR average length diminishment rate with temperature in the second region (0.326 microns/° C.) was approximately threefold of the rate in the first and third regions.

FIG. 1B depicts the relationship between the gel curing temperature and CNR diameter thereof. It could be observed that the CNR average diameter decreases almost exponentially with increasing curing temperature in the range of 40° C.±1° C. to 85° C. 1° C., after which it becomes almost constant. In addition, the curve in FIG. 1B is divided into two regions of CNR average diameters. The first region ranges from 3231 to 140 nm for the corresponding curing temperature range of 40° C.±1° C. to 85° C.±1° C. Further, this region is characterized by steep trend in the CNR average diameter, while in the second region the average diameter of CNR inclined slightly from 140 to 127 nm for the corresponding temperature range of 85±1° C. to 100±1° C. It is noteworthy that the concentrations of resorcinol, $Na_2CO_3$ and formaldehyde solution in initial media of gel synthesis were fixed at 462 mg/ml water, 8.90 mg/ml water and 1.10 mg/ml water, respectively.

Generally, it can be seen that both the average length and diameter of CNRs decrease when increasing the gelation temperature in the initial synthesis of gel. Nonetheless, there is an optimal temperature that creates CNRs without distortions or deformations in geometry. This optimal temperature corresponding to the parameters fixed herein is 85° C.±1° C. The determination of this optimal temperature was based on observations and analyses of the Nano Scanning Electron Microscopy (Nano-SEM) photomicrographs. Also, the range of DFT surface areas of CNR samples is of 1 to 180 $m^2/g$.

Figure 2A:
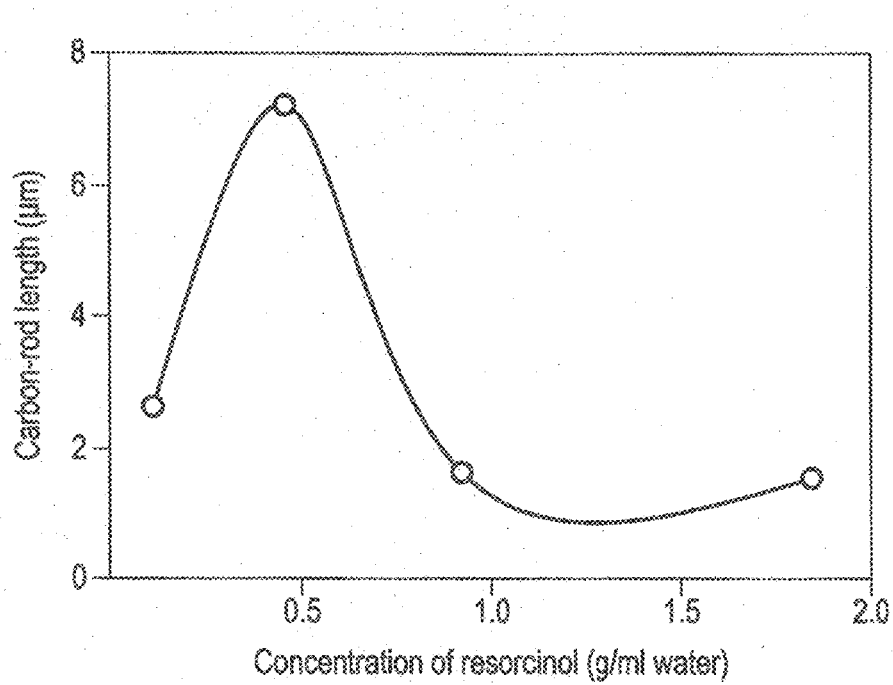
FIG. 2A is a graph depicting the effect of resorcinol concentration on the average length of the CNRs in a method of synthesizing carbon nanorods and carbon nanowires according to the present invention.
Figure 2B:
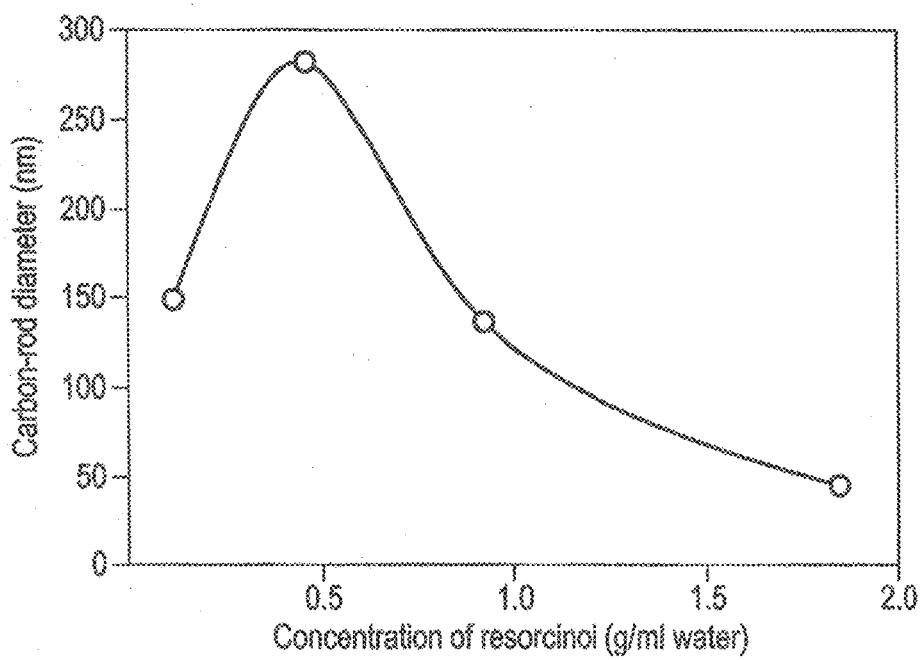
FIG. 2B is a graph depicting the effect of resorcinol concentration on the average diameter of the CNRs in a method of synthesizing carbon nanorods and carbon nanowires according to the present invention.

FIGS. 2A and 2B display the effect of resorcinol concentration on the average length (FIG. 2A) and diameter (FIG. 2B) of the growth of the CNR. The studied range of resorcinol concentration is of 0.12 to 1.85 g/ml water. The proportions of $Na_2CO_3$ and formaldehyde solution relative to water in initial solution of gel synthesis are fixed at 8.90 mg/ml water and 1.10 mg/ml water, respectively. In addition, the curing temperature in initial synthesis of gel was fixed at 70° C.±1° C.

FIG. 2A shows that when increasing the concentration of resorcinol in the initial reactants solution (during gel synthesis), the CNR average length change is in a nonlinear manner. For the lowest studied resorcinol concentration of 0.12 g/ml water, the average length of the CNRs is 2.61 nm and it reached a maximal average length of 7.20 microns for the corresponding resorcinol concentration of 0.46 g/ml water. Thereafter, the average length of the CNRs decreased down to 1.61 microns when increasing resorcinol concentration up to 0.92 g/ml water. Thereafter, the average lengths of the CNR decrease slightly to an average length of 1.49 microns for the corresponding maximum studied resorcinol concentration of ~1.85 g/ml water. Therefore, at the studied conditions, the optimal concentration of resorcinol in initial solution (to give a maximum CNR average length of 7.20 microns is 0.46 g/ml water. As a result, the increment or decrement of the average length of CNRs is restricted by a certain range of resorcinol concentration, in the initial solution used in gel synthesis.

FIG. 2B depicts the relationship between the average diameter of CNRs (in nm) and the concentration of resorcinol in the initial solutions of gel synthesis. The fixed curing temperature in this experiment is at 70° C.±1° C. The range of the studied resorcinol concentration is from 0.12 to 1.85 g/ml water. Generally, it was observed that by increasing the concentration of resorcinol in the initial solution of gel synthesis, the average diameter of the CNRs increases to a maximum value, and then decreases. The average diameter of the CNR is 148.50 nm for the corresponding concentration of resorcinol of 0.12 g/ml water. The maximum average diameter of 281.8 nm was obtained at a resorcinol concentration of 0.46 g/ml water. Thereafter, the average diameter inclined to 42.40 nm for the corresponding resorcinol concentration of 1.85 g/ml water. Therefore, it is obvious that the concentration of resorcinol in the initial solution of gel synthesis plays a pivotal role in determining and designing the average diameter of the CNRs. Furthermore, the range of corresponding DFT surface areas of the CNR samples is of 5 to 77 $m^2/g$.

The effect of $Na_2CO_3$ Catalyst Concentration on the growth of the CNRs was investigated by altering the catalyst concentration while fixing other parameters.

Figure 3A:
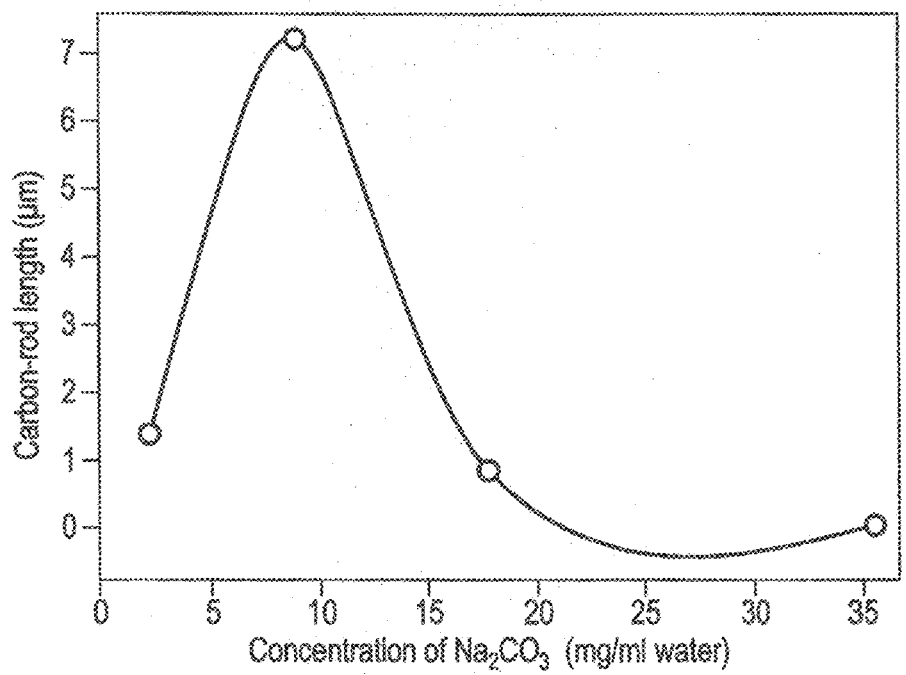
FIG. 3A is a graph illustrating the effect of the catalyst ($Na_2CO_3$) concentration in the initial solution of gel synthesis on the resulting average growth of the length (nm) of the CNRs in a method of synthesizing carbon nanorods and carbon nanowires according to the present invention.
Figure 3B:
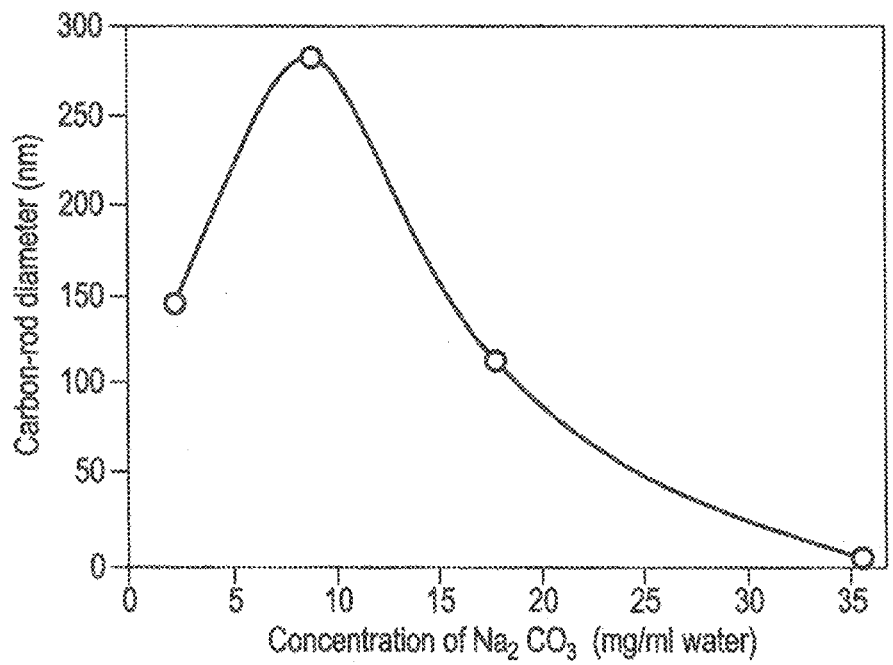
FIG. 3B is a graph depicting illustrating the effect of the catalyst ($Na_2CO_3$) concentration in the initial solution of gel synthesis on the resulting average growth of the diameter (nm) of the CNRs in a method of synthesizing carbon nanorods and carbon nanowires according to the present invention.
Figure 4A:
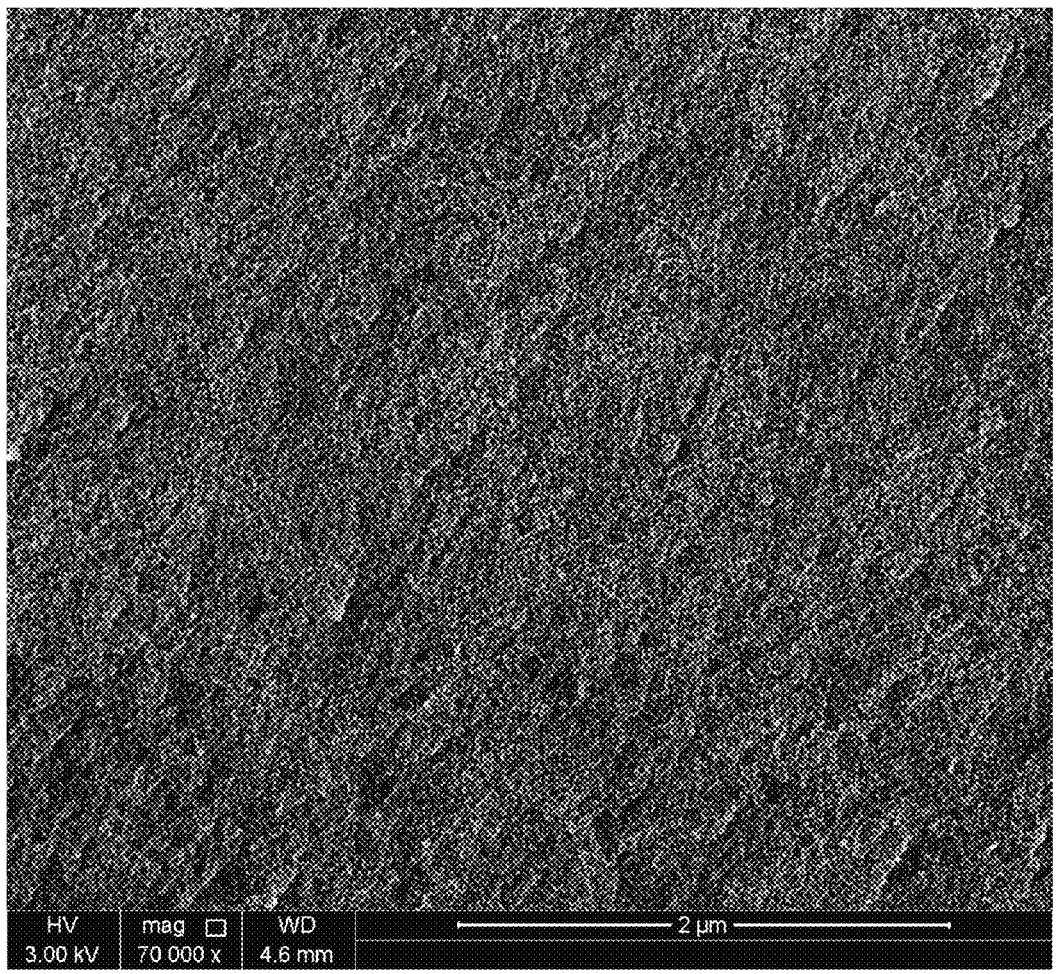
FIGS. 4A, 4B, 4C, 4D, and 4E are different Nano Scanning Electron Microscopy (Nano-SEM) photomicrographs of resorcinol-formaldehyde gel, which was synthesized at different gelation temperatures in a method of synthesizing carbon nanorods and carbon nanowires according to the present invention.
Figure 4B:
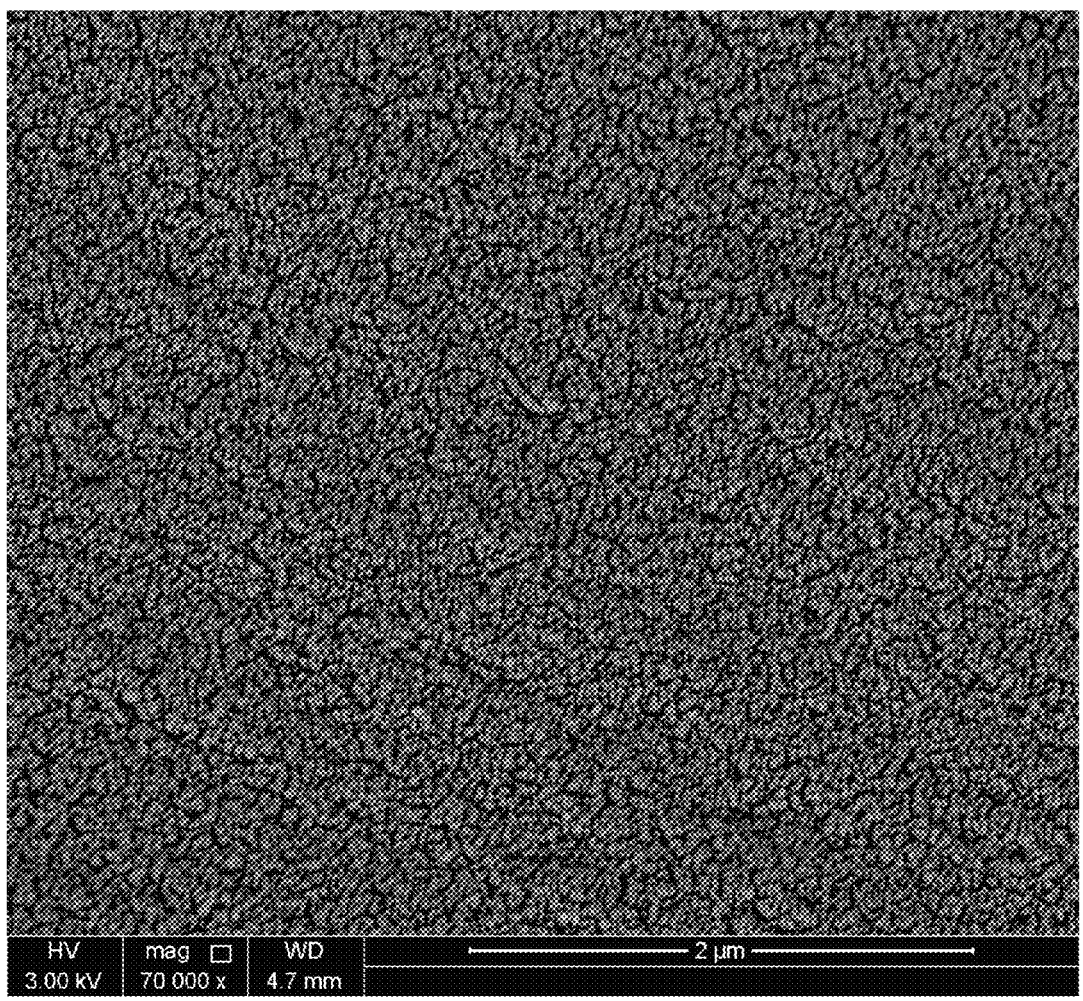
Figure 4C:
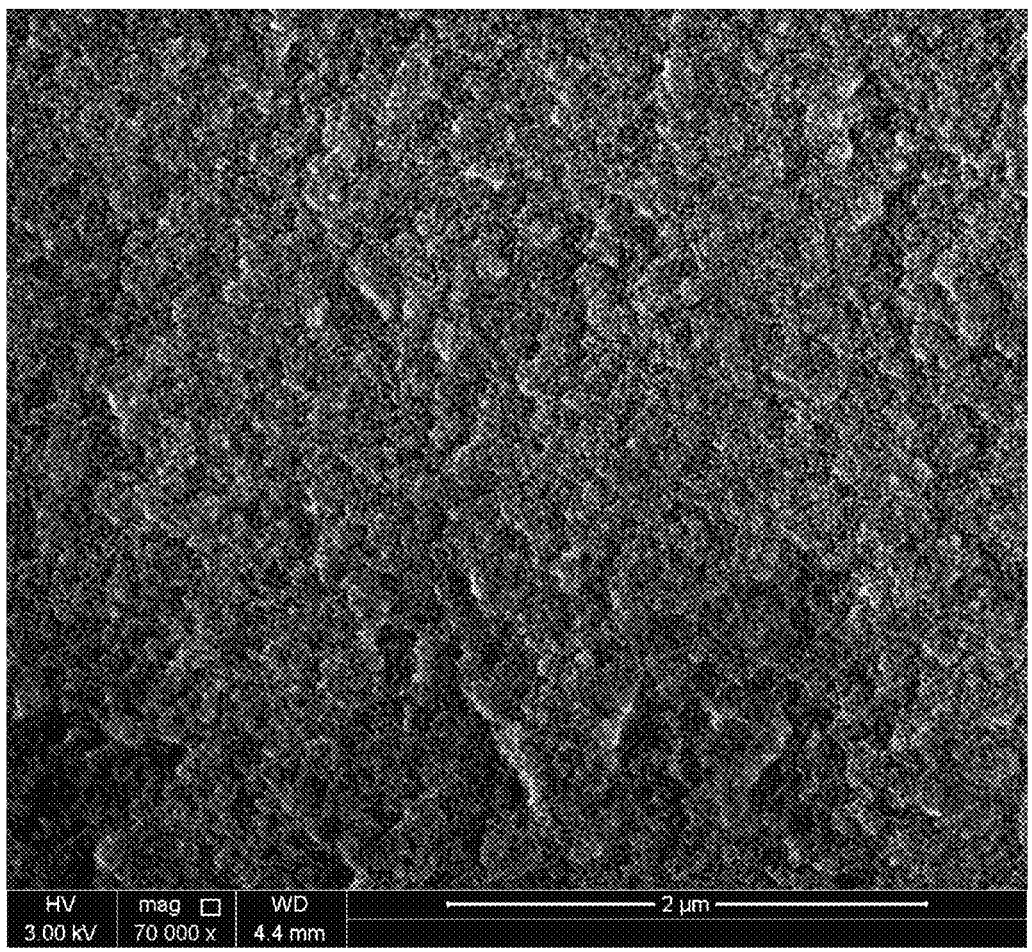
Figure 4D:
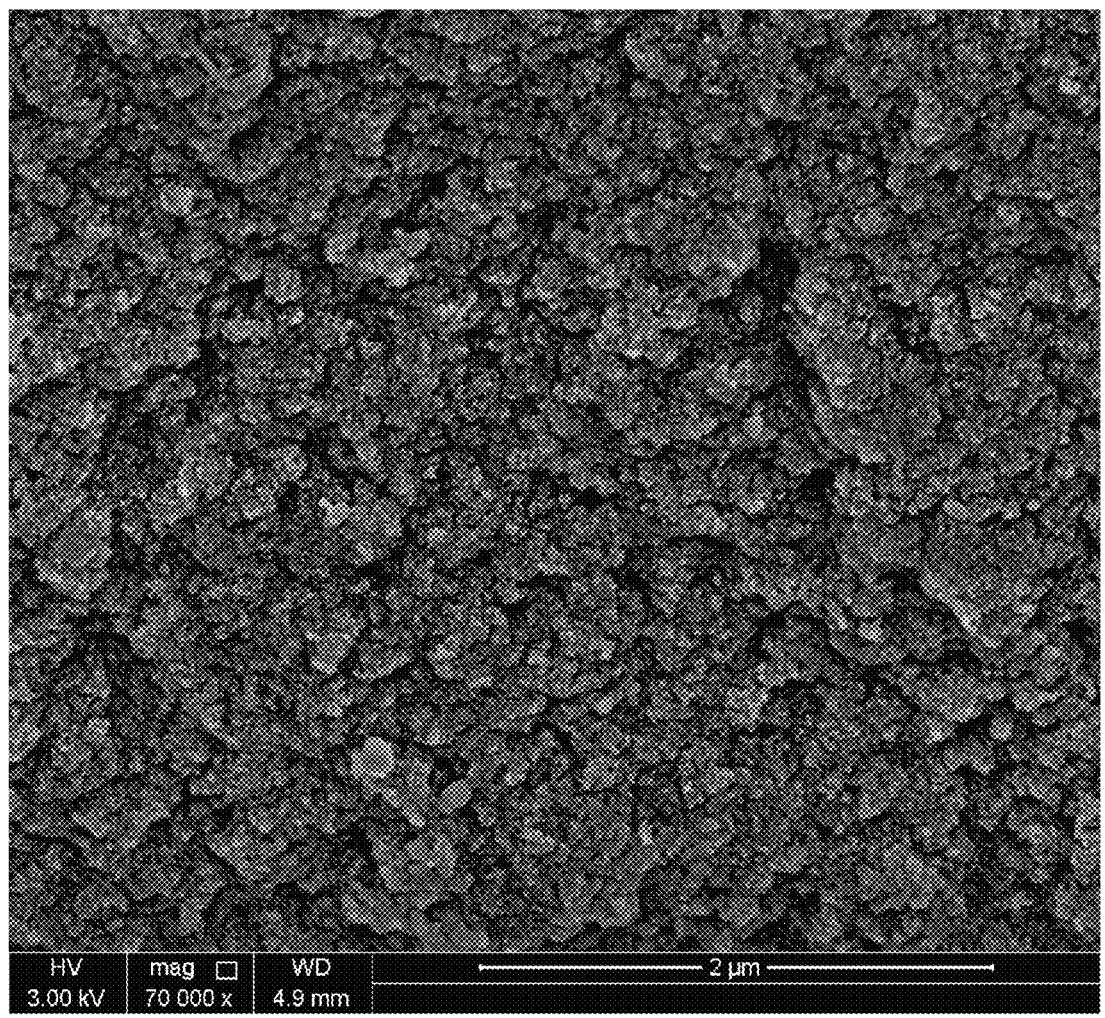
Figure 4E:
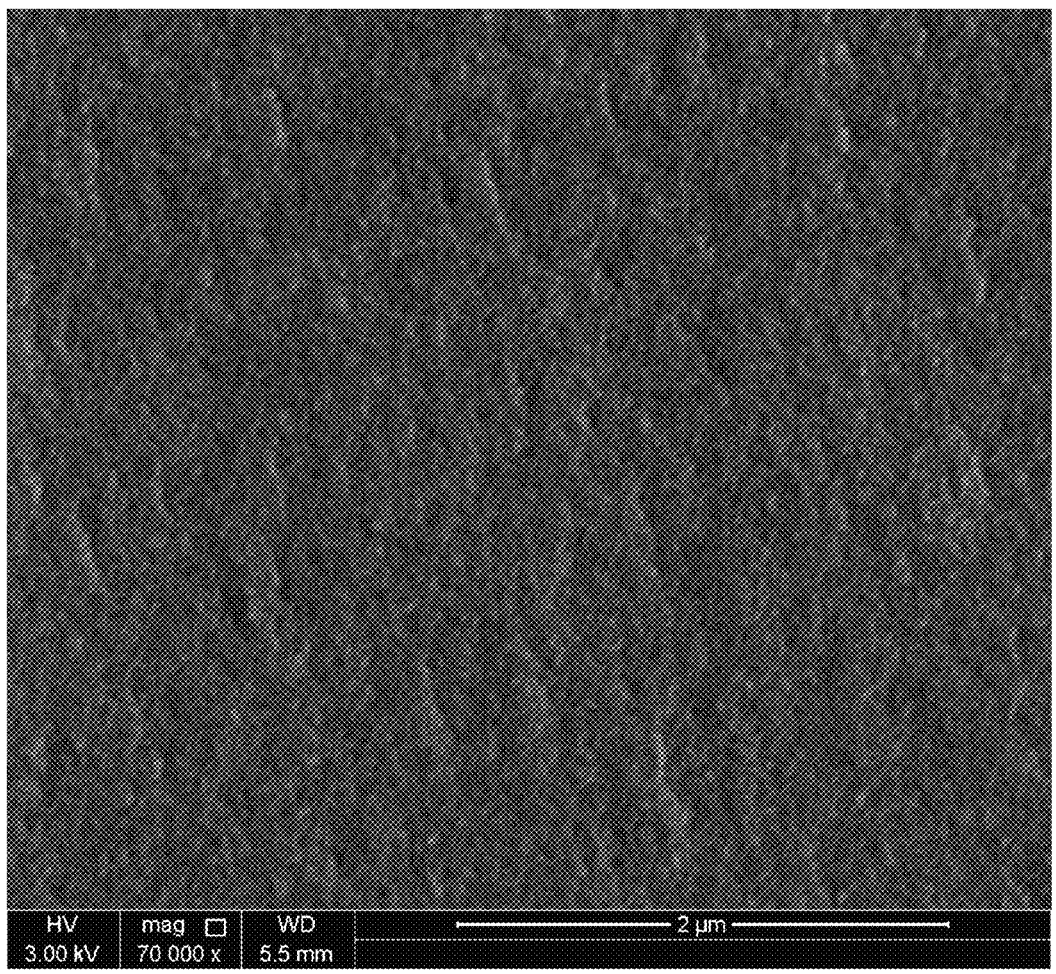

FIGS. 3A and 3B generally show the effect of $Na_2CO_3$ concentration in the initial solution of gel synthesis on the resulting average growth of the CNRs. The range of studied $Na_2CO_3$ concentration is of ~2.20 to 35.60 mg/ml water. The gelation temperature and initial solution pH value were both held constant at 70° C.±1° C. and 7.0, respectively. It was observed from FIG. 3A that when increasing the $Na_2CO_3$ concentration in the initial solution of gel synthesis; the average length of the CNRs increases to reach a maximal value, followed by inclination to a minimal value and then almost leveling off. At the lowest $Na_2CO_3$ concentration of 2.20 mg/ml water, the average length of the CNRs was 1.36 microns, which increased to a maximum average length of 7.20 microns at the corresponding $Na_2CO_3$ concentration of 8.90 mg/ml water. Thereafter, a decrement occurred to 0.00 microns for the corresponding $Na_2CO_3$ concentration of 35.6 mg/ml water. Therefore, it can be observed that the CNRs average length depends strongly on the $Na_2CO_3$ concentration in the initial solution of gel synthesis. Furthermore, at the studied conditions, the $Na_2CO_3$ concentration of 8.90 mg/ml water is considered to be a conversion point of CNRs growth. At this point, the average length of the CNRs is 5.25 times the corresponding average length at the lowest studied $Na_2CO_3$ concentration of 2.2 mg/ml water.

FIG. 3B shows the effect of $Na_2CO_3$ catalyst concentration in the initial solution of gel synthesis on the growth of the average diameter of the CNRs. It was observed that the CNRs average diameter increases with increasing $Na_2CO_3$ concentration in the solution of gel synthesis to a certain value, and then inclination occurred. Further, the range of $Na_2CO_3$ concentration used here is from 2.20 to 35.60 mg/ml water. At the lowest $Na_2CO_3$ concentration of 2.2 mg/ml water, the average diameter of the CNRs was 143.60 nm; which increased to a maximum average diameter of 281.80 nm at the corresponding $Na_2CO_3$ concentration of 8.90 mg/ml water. Hereafter, the decrement of the average diameter goes to 0.00 nm for the maximum studied $Na_2CO_3$ concentration of 35.60 mg/ml water. Therefore, the optimum concentration of $Na_2CO_3$ to grow the highest CNRs average diameter at the studied conditions is 8.90 mg/ml water. Consequently, it was obvious that the $Na_2CO_3$ concentration affects significantly the average diameter of the resulting CNRs. Further, at the conditions used in these experiments, the DFT surface areas of resulting CNR samples are in the range of 1 to 43 $m^2/g$.

Two theories can be used to explain the possible growth mechanism for the formation mechanism of CNRs. Both of these theories are related to arc discharge methods. Furthermore, this novel study presents a completely different mechanism from prior literature theories. The growth mechanism of this study needs further investigations regarding the corresponding three phases of formation: (i) seed formation (Phase-I), (ii) initial growth of CNRs (Phase-II) and (iii) growth, termination (Phase-III).

FIGS. 4A-4E show different Nano-SEM photomicrographs of resorcinol-formaldehyde gel, which was synthesized at different gelation temperatures. The concentrations of resorcinol, $Na_2CO_3$, and formaldehyde used in the initial solution of gel synthesis are fixed at 462 mg/ml water, ~8.90 mg/ml water and ~1.10 mg/ml water, respectively. The scale bar length in each of these Nano-SEM photomicrographs is 2 microns with a magnification factor of 70.000×. Further, the gelation temperature range studied herein is of 40° C.±1° C. to 100° C.±1° C. The photomicrographs presented in FIGS. 4A-4E show clearly that the gel samples do not contain any growth of nanorods or nanowires at this stage. Therefore, the growth of such nanostructures does not appear at the gel formation stage.

Figure 5A:
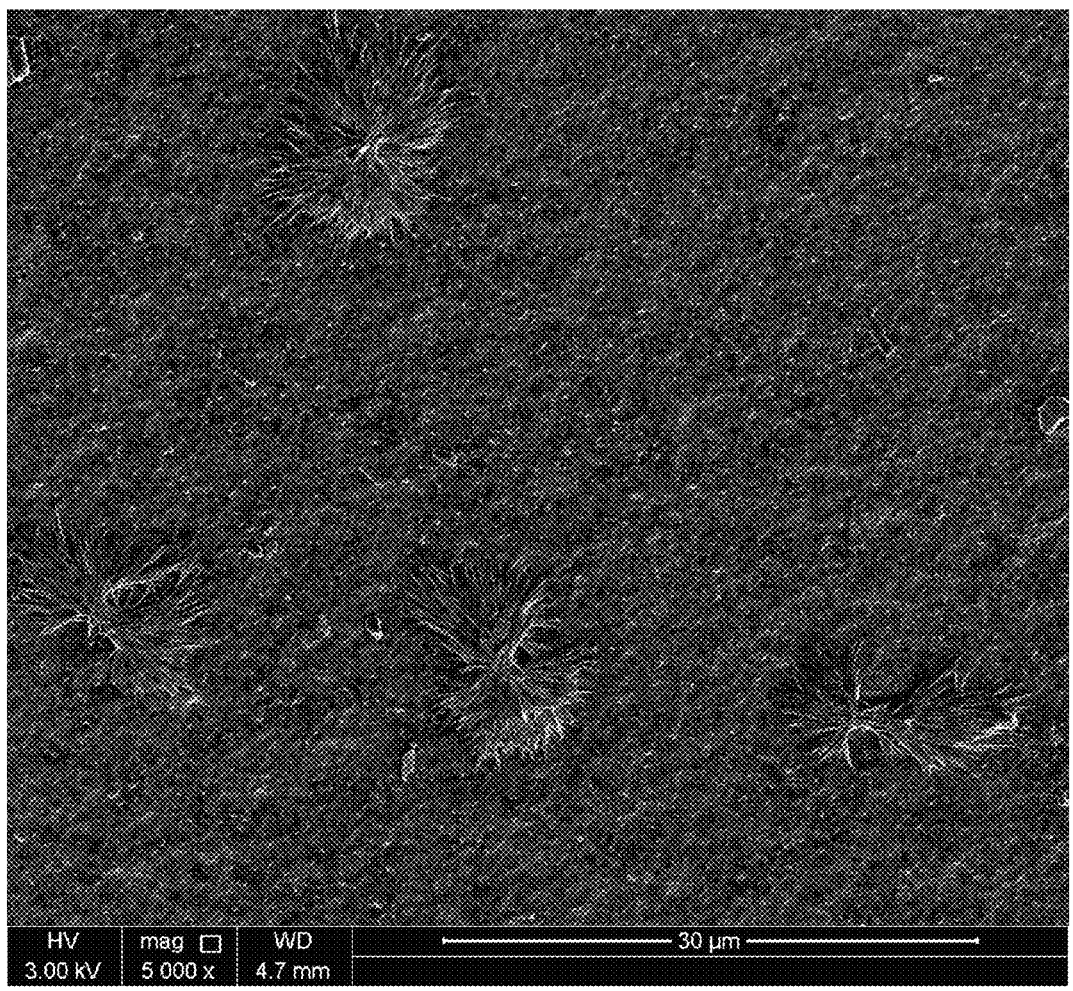
FIGS. 5A, 5B, 5C, 5D, 5E, 5F, 5G, 5H, 5I, and 5J are Nano Scanning Electron Microscopy (Nano-SEM) photomicrographs of resorcinol-formaldehyde carbonized gels that were synthesized at different conditions in a method of synthesizing carbon nanorods and carbon nanowires according to the present invention.
Figure 5B:
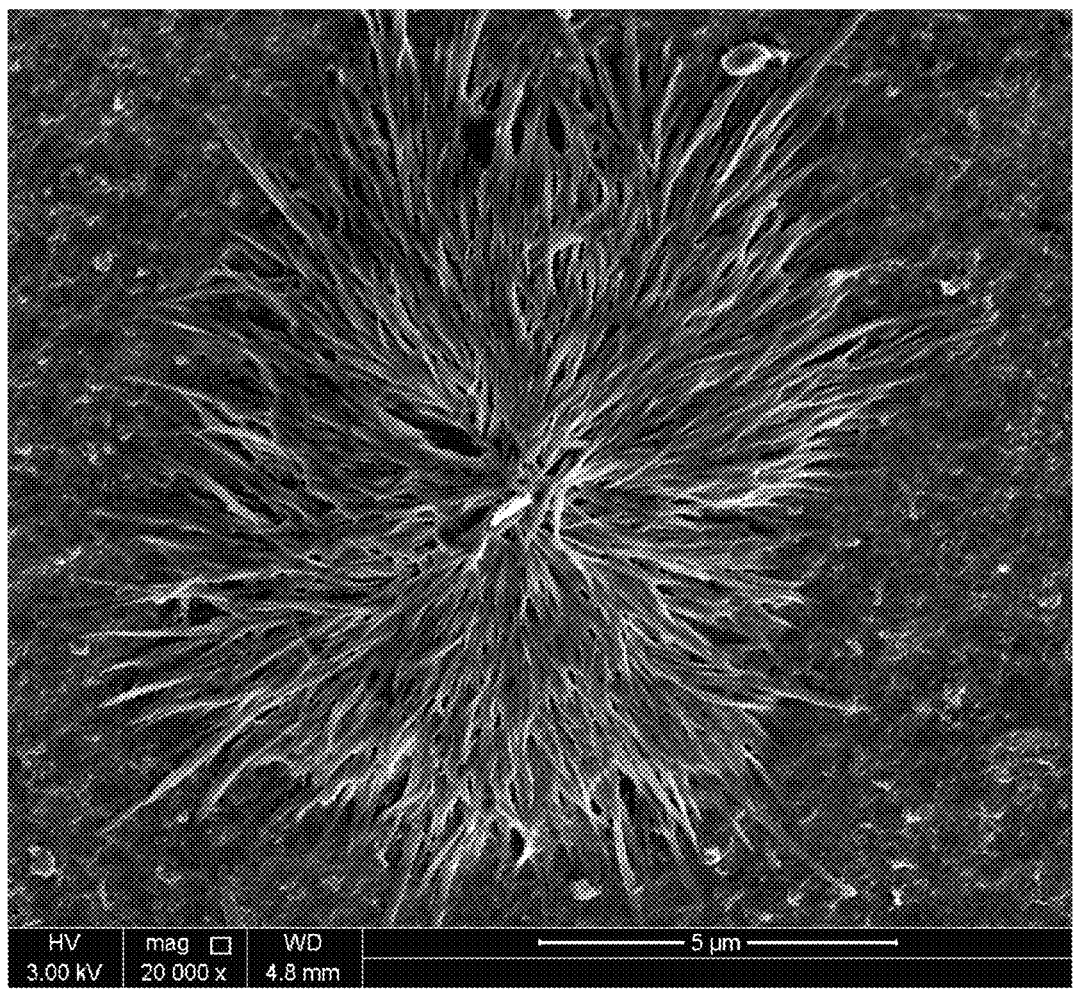
Figure 5C:
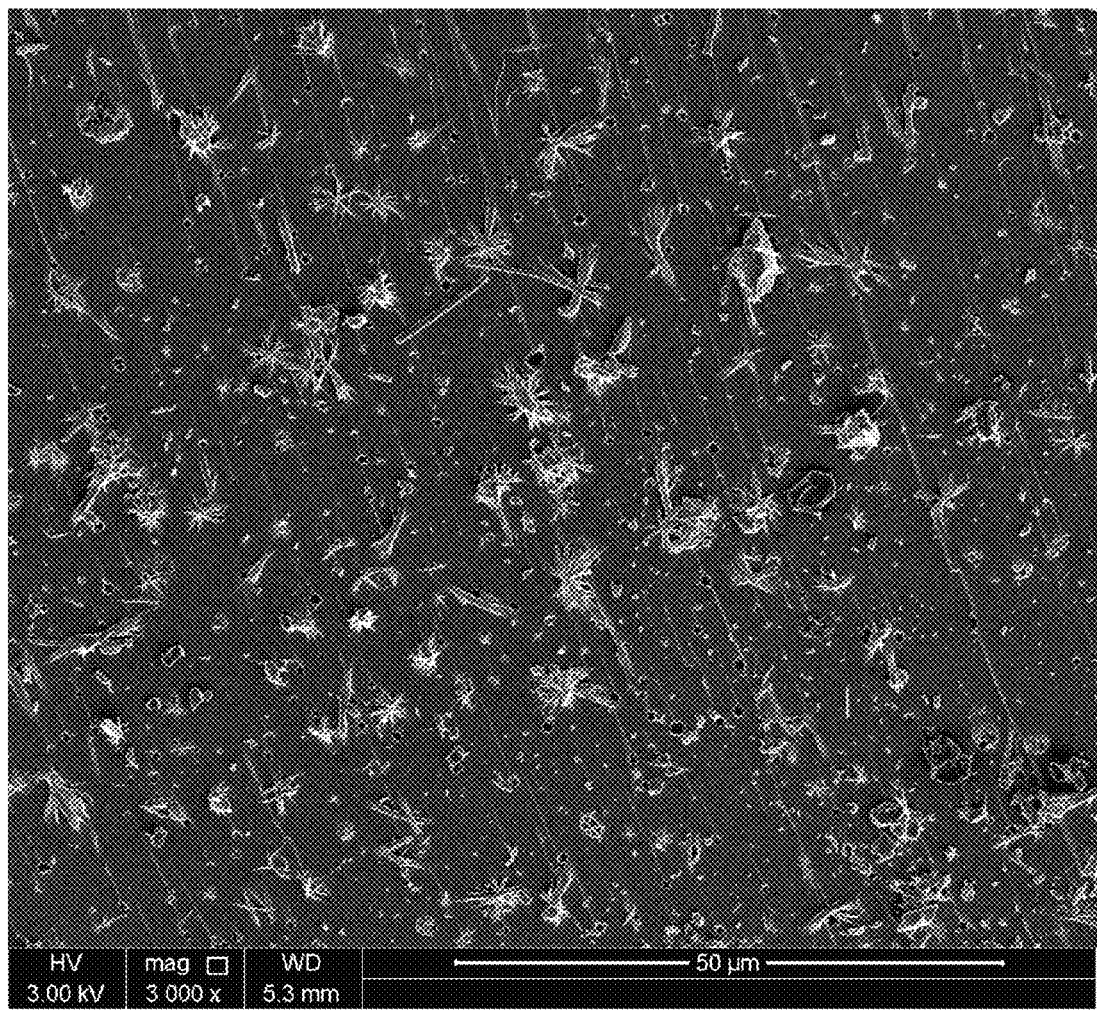
Figure 5D:
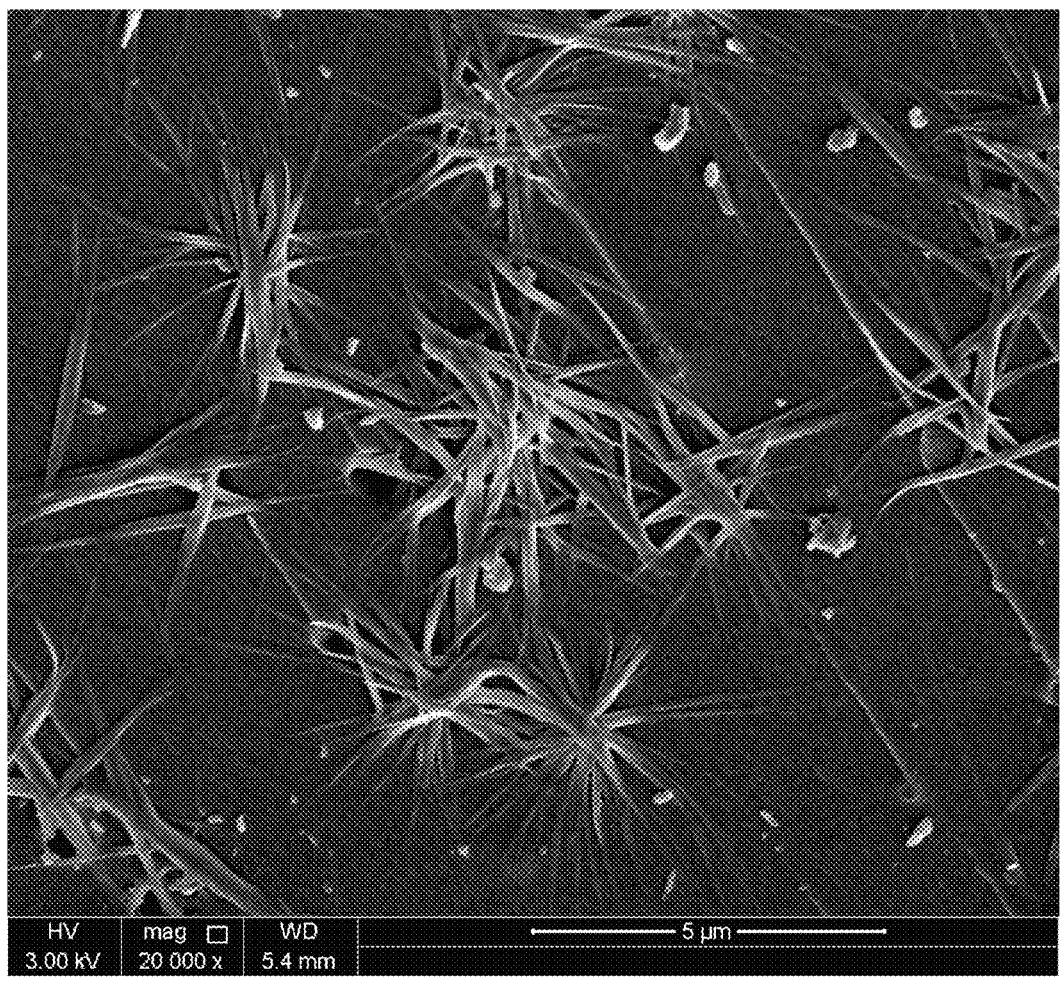
Figure 5E:
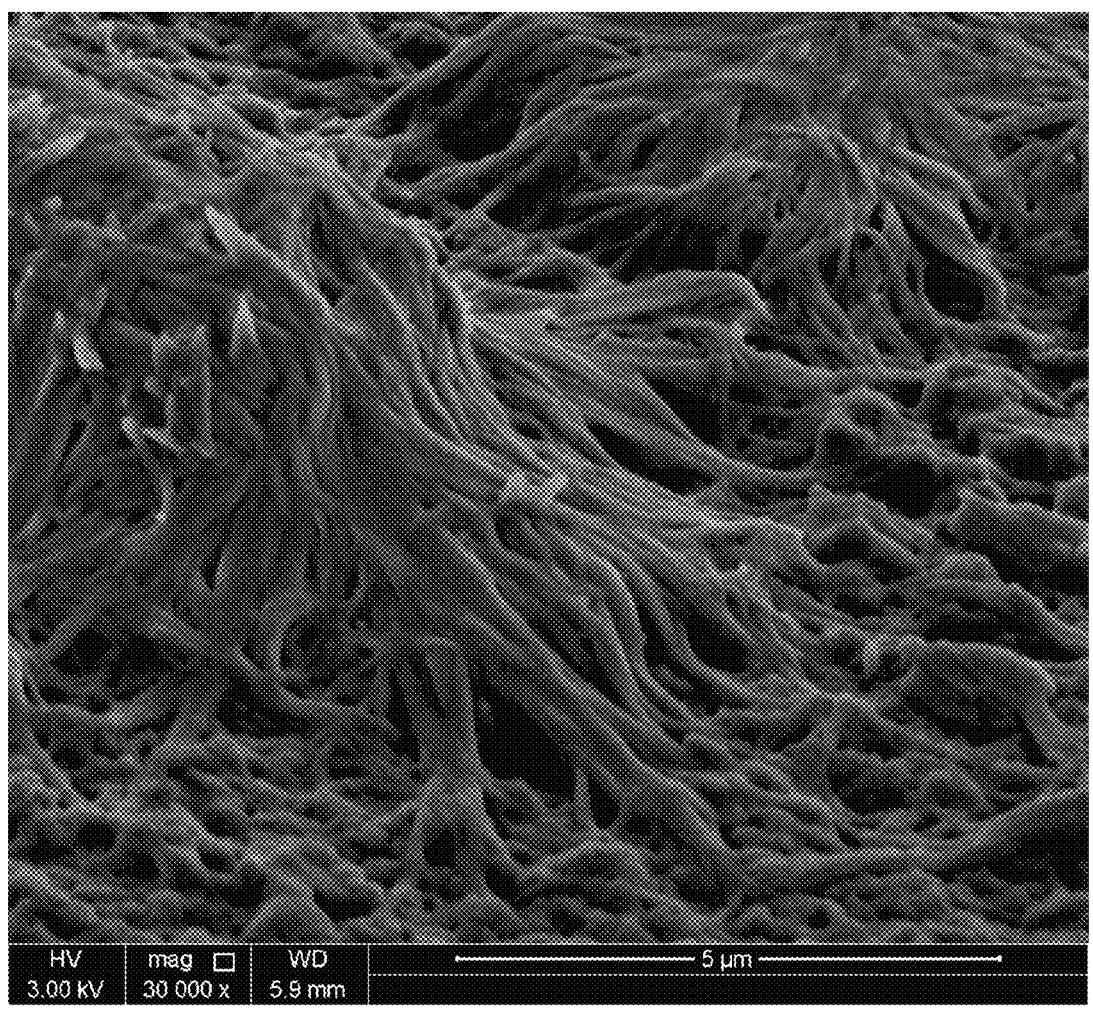
Figure 5F:
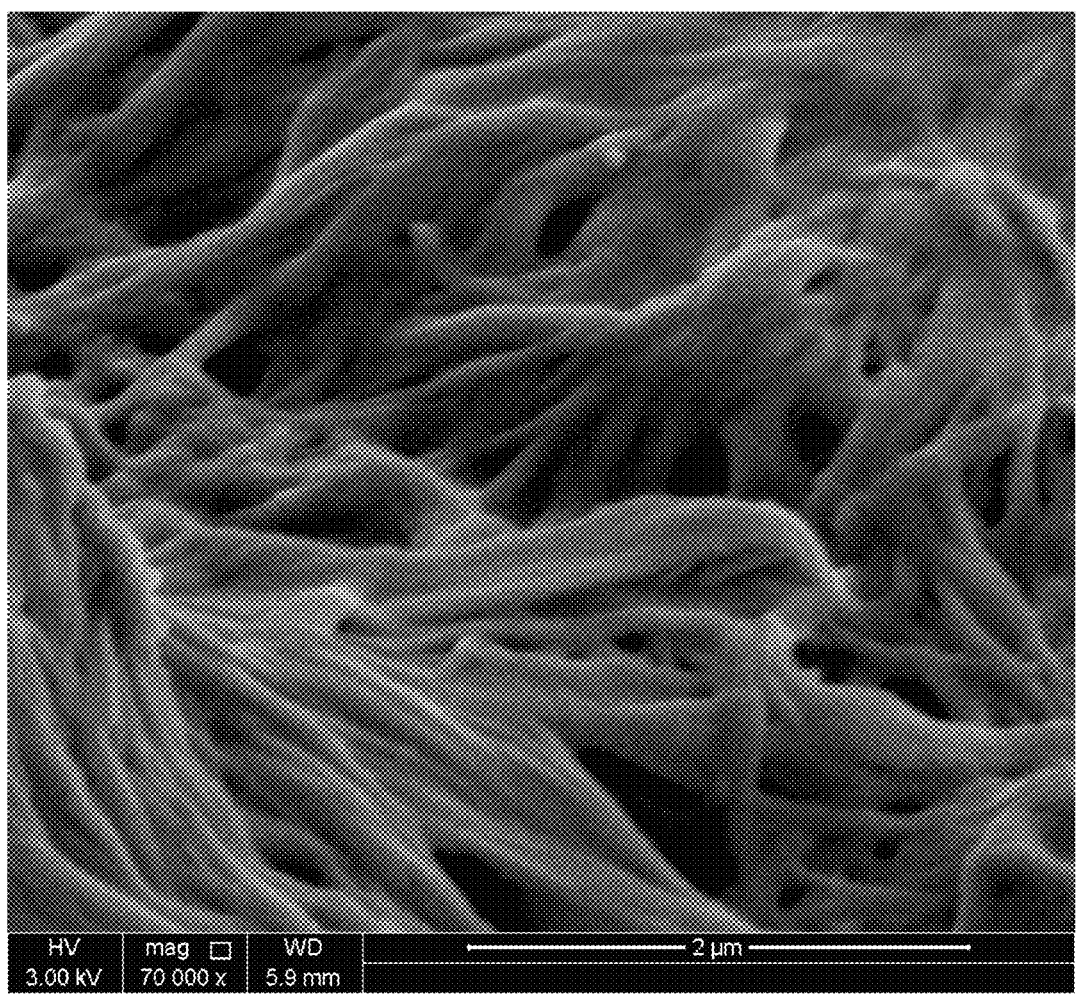
Figure 5G:
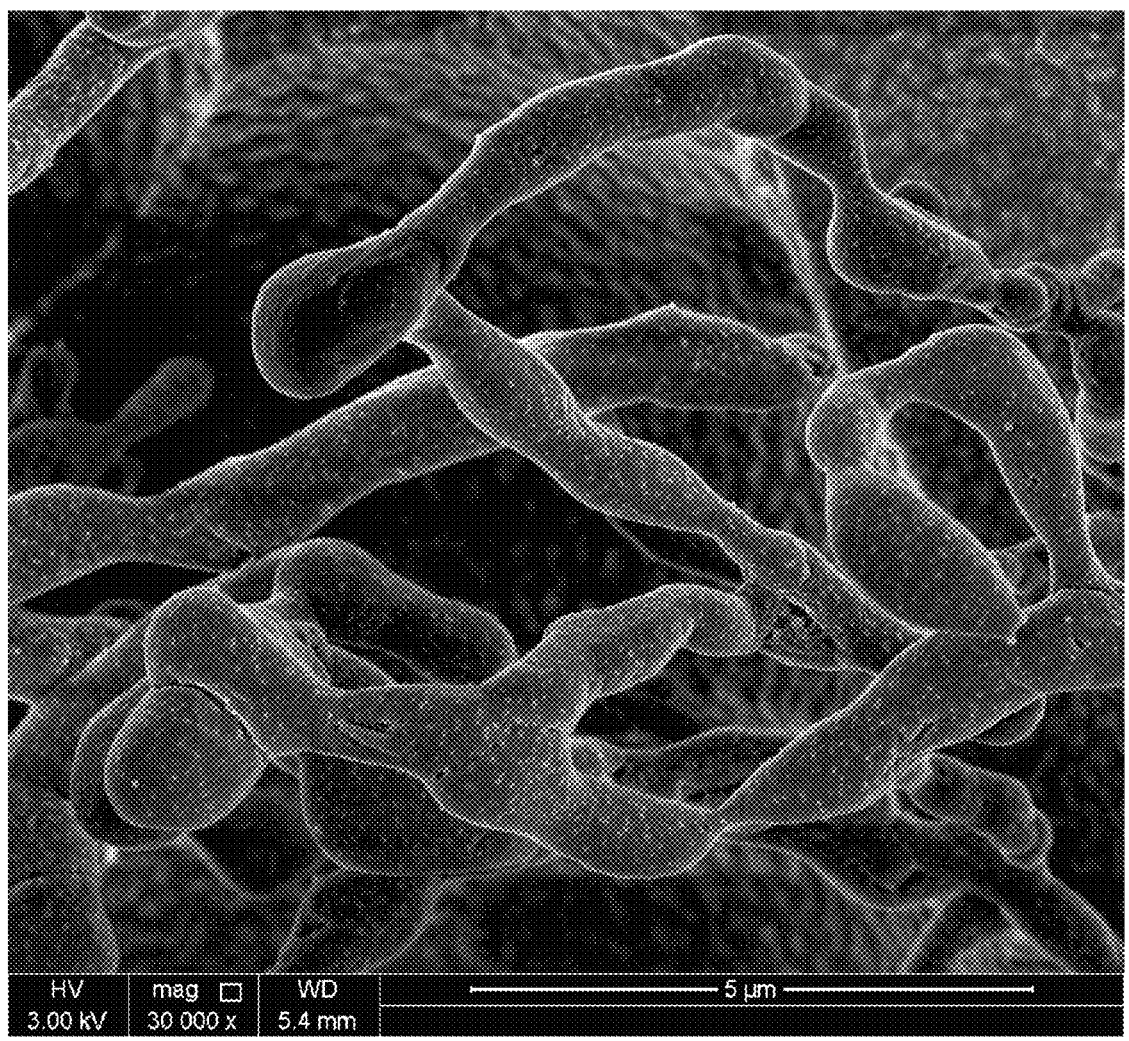
Figure 5H:
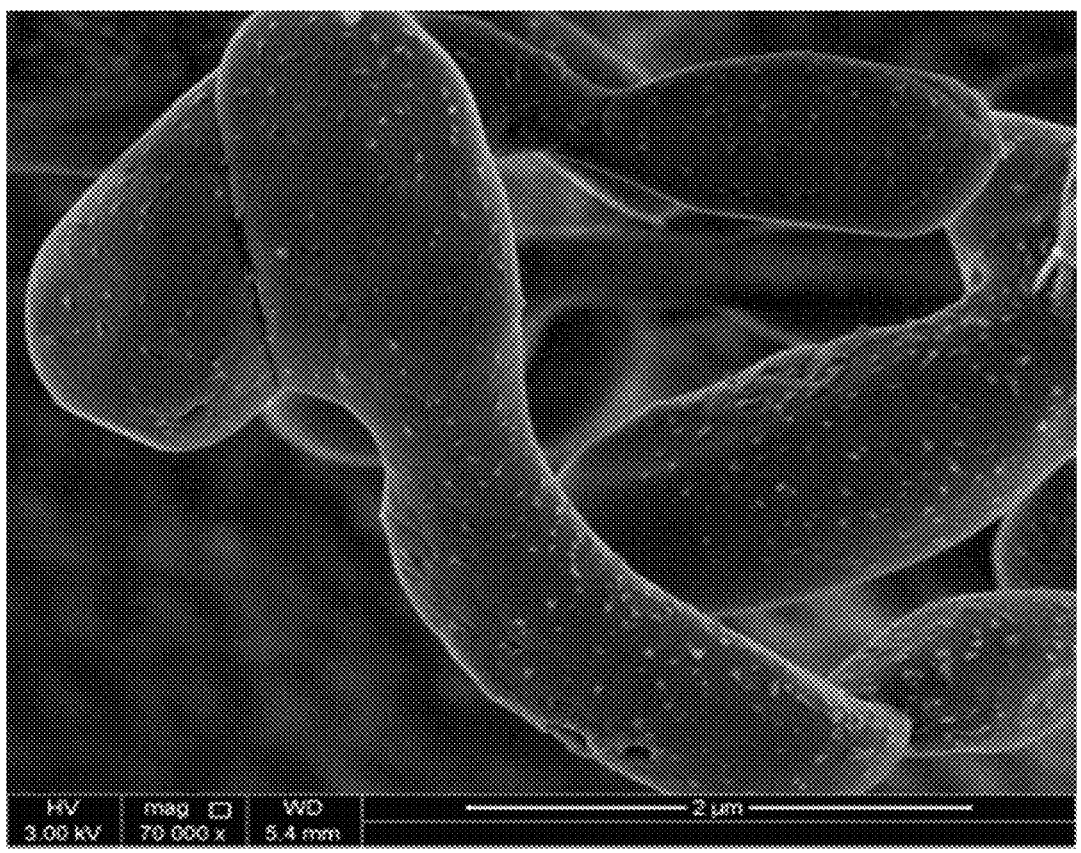
Figure 5I:
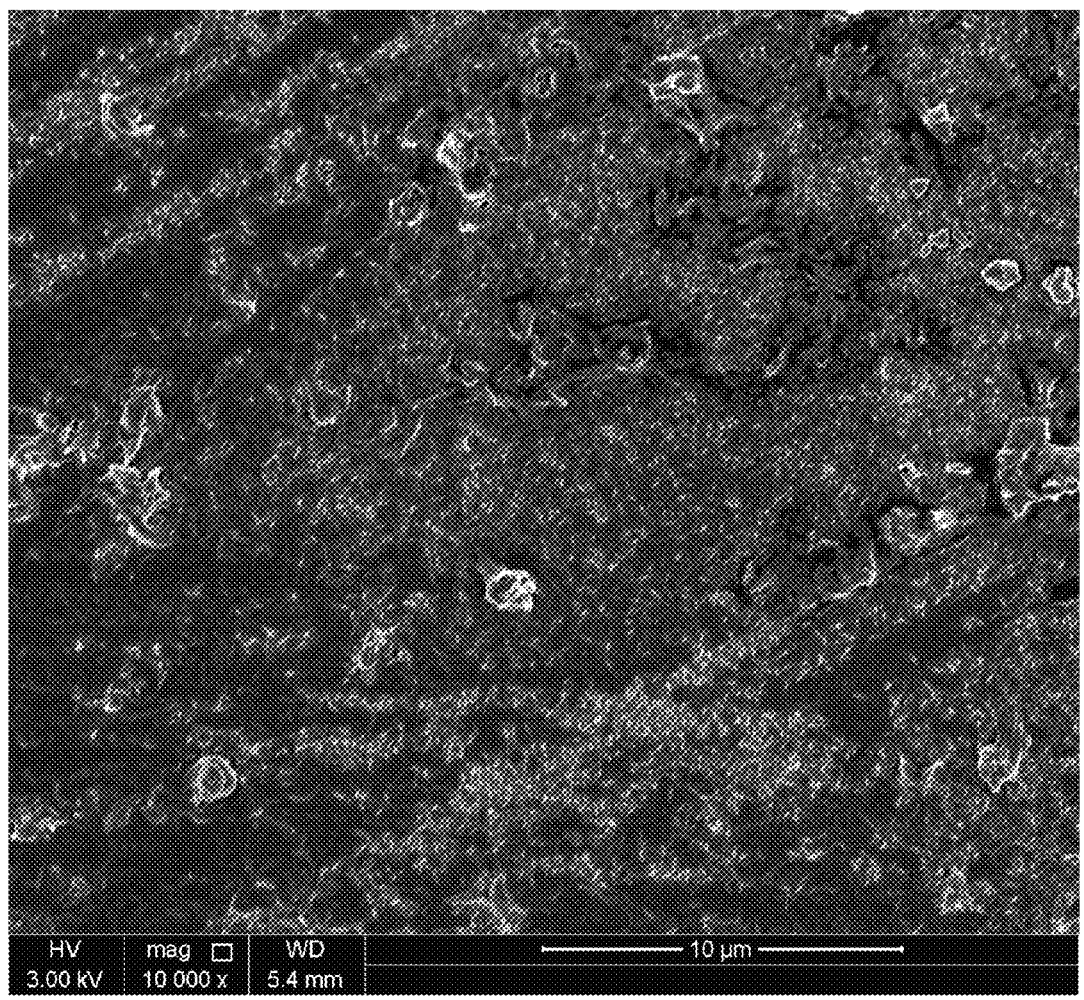
Figure 5J:
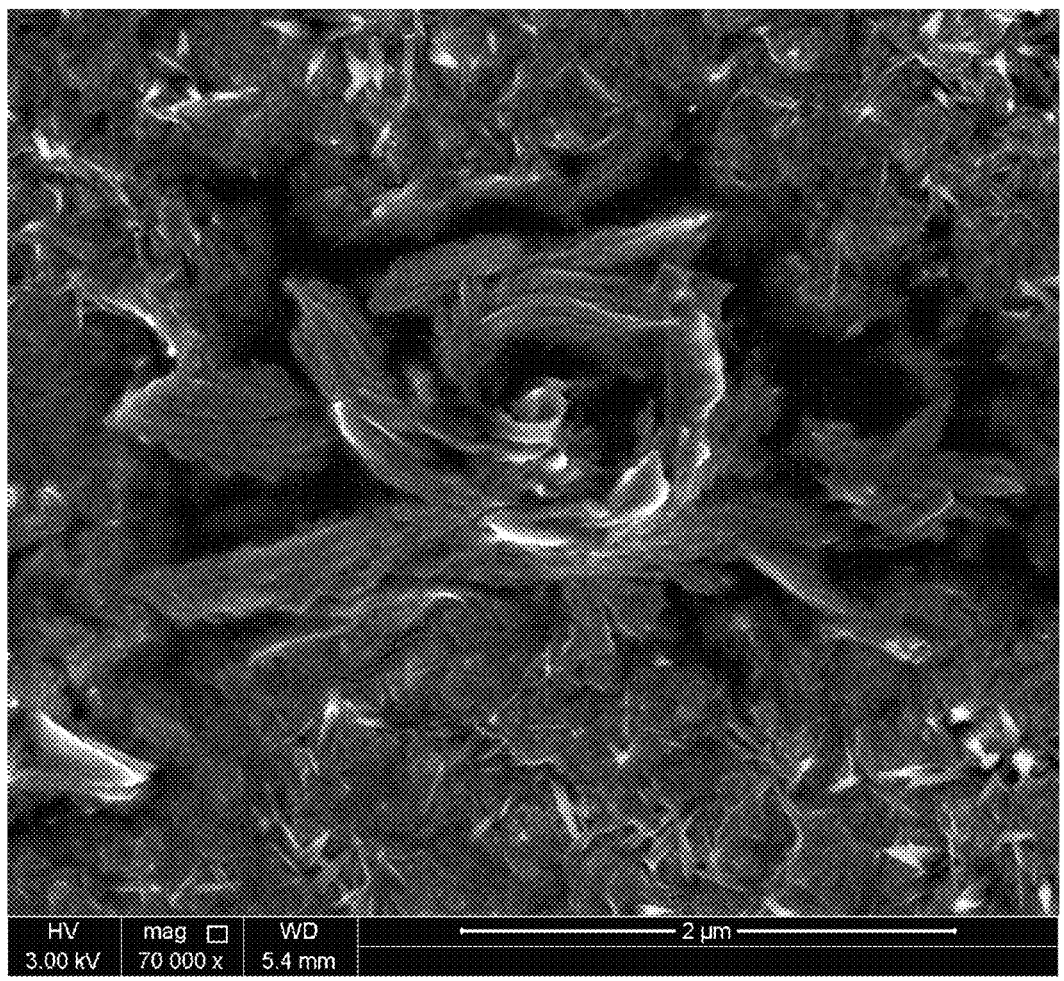
Figure 6A:
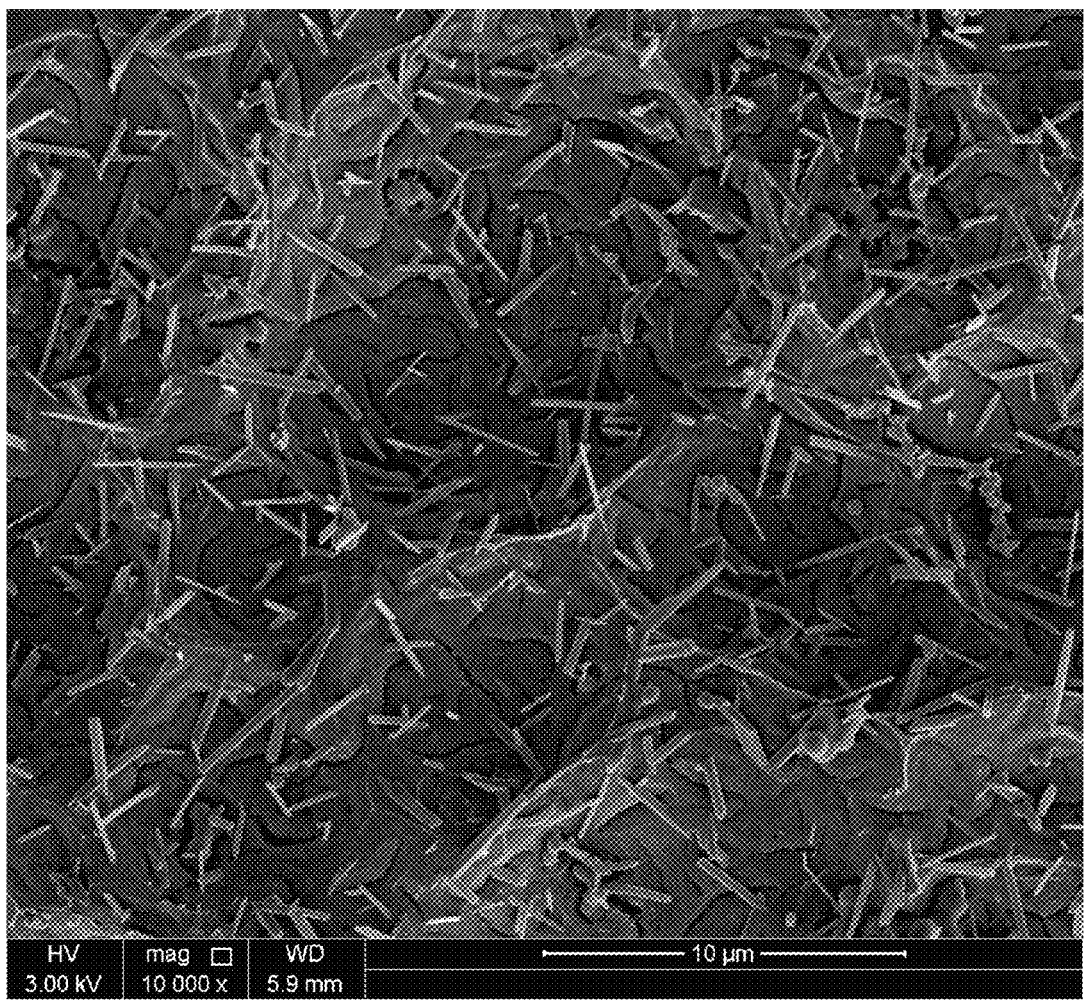
FIGS. 6A, 6B, 6C, 6D, 6E, and 6F are Nano Scanning Electron Microscopy (Nano-SEM) photomicrographs of resorcinol-formaldehyde activated CNRs after the physical activation process of the carbonized stage presented in FIG. 5 in a method of synthesizing carbon nanorods and carbon nanowires according to the present invention.
Figure 6B:
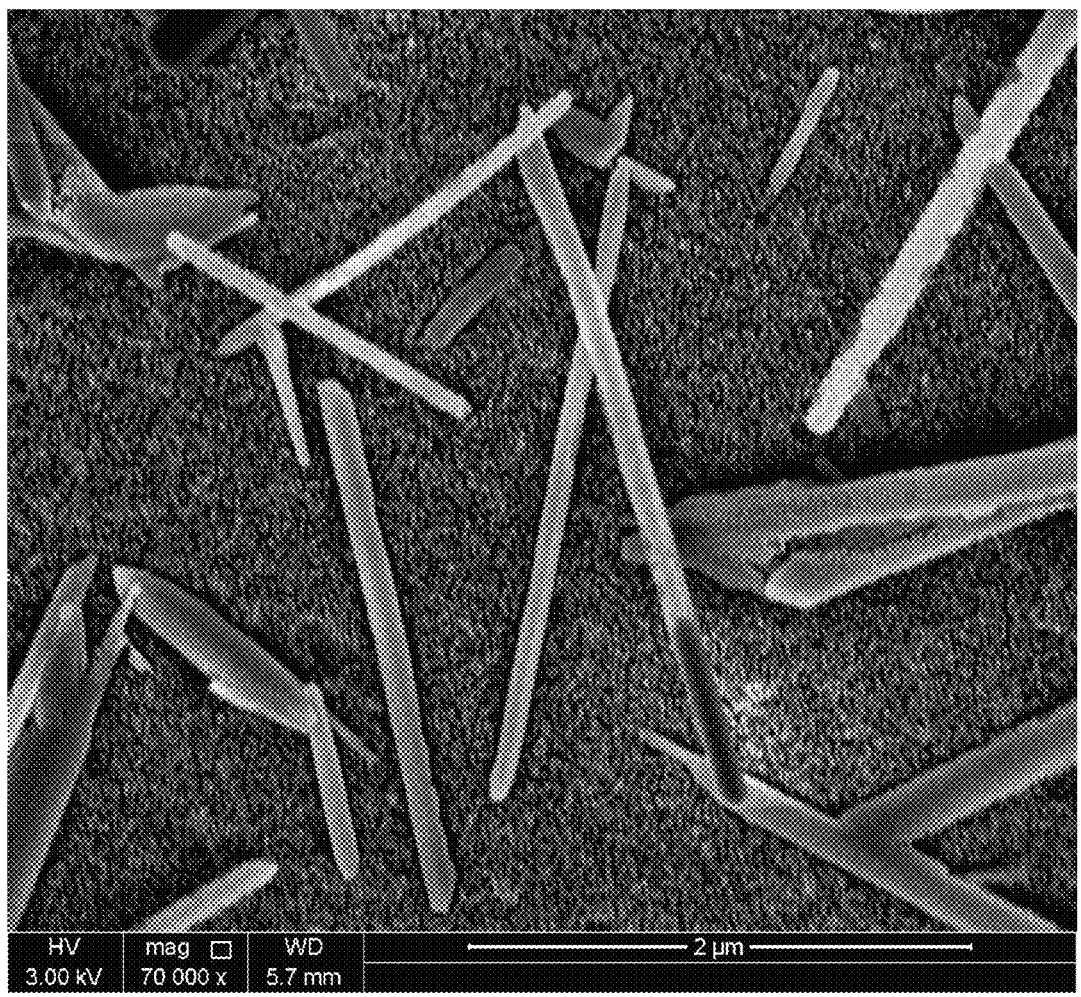
Figure 6C:
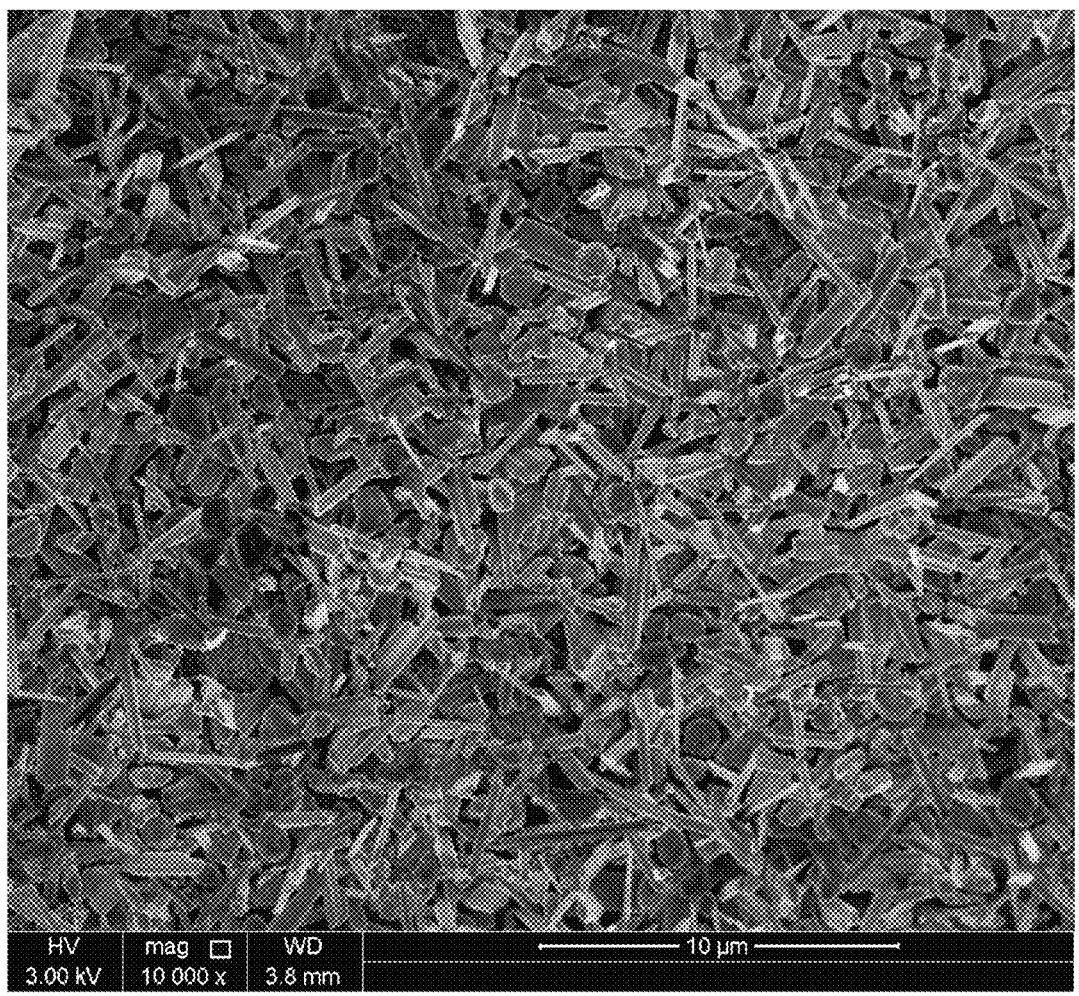
Figure 6D:
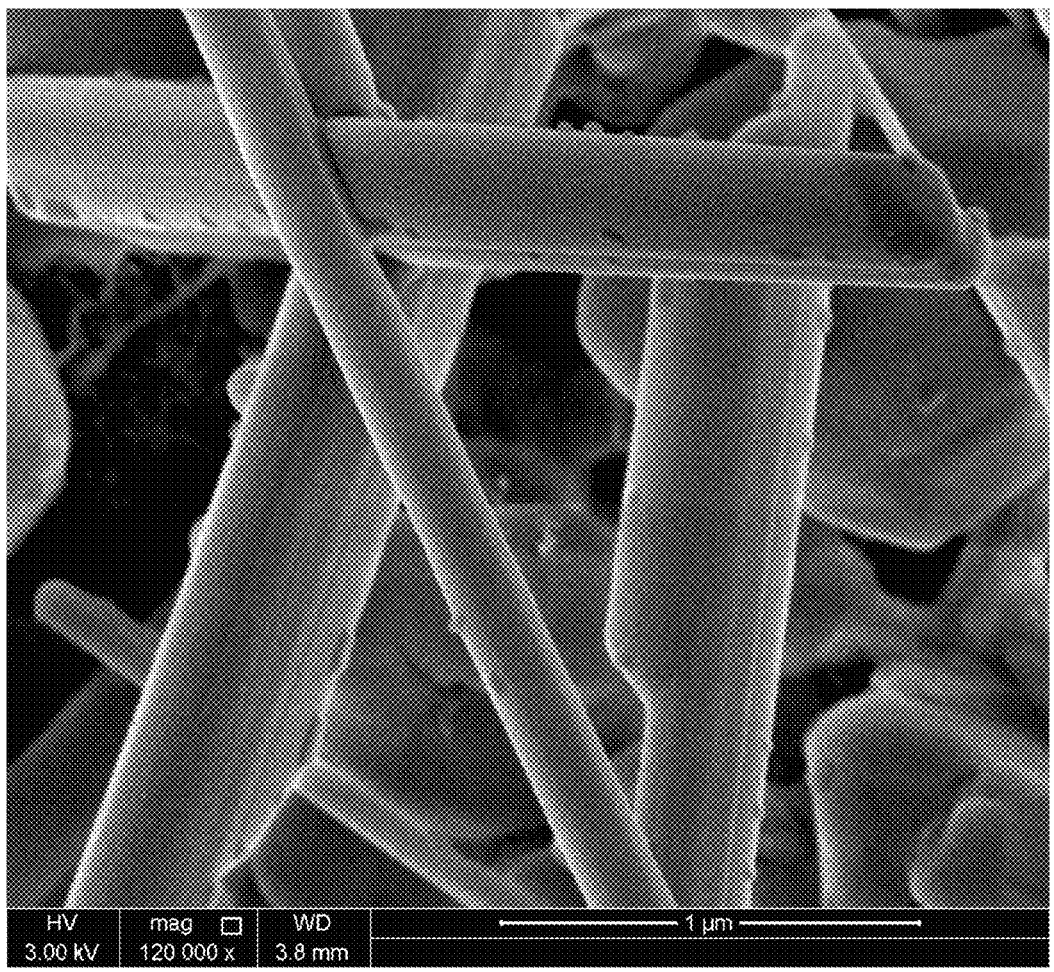
Figure 6E:
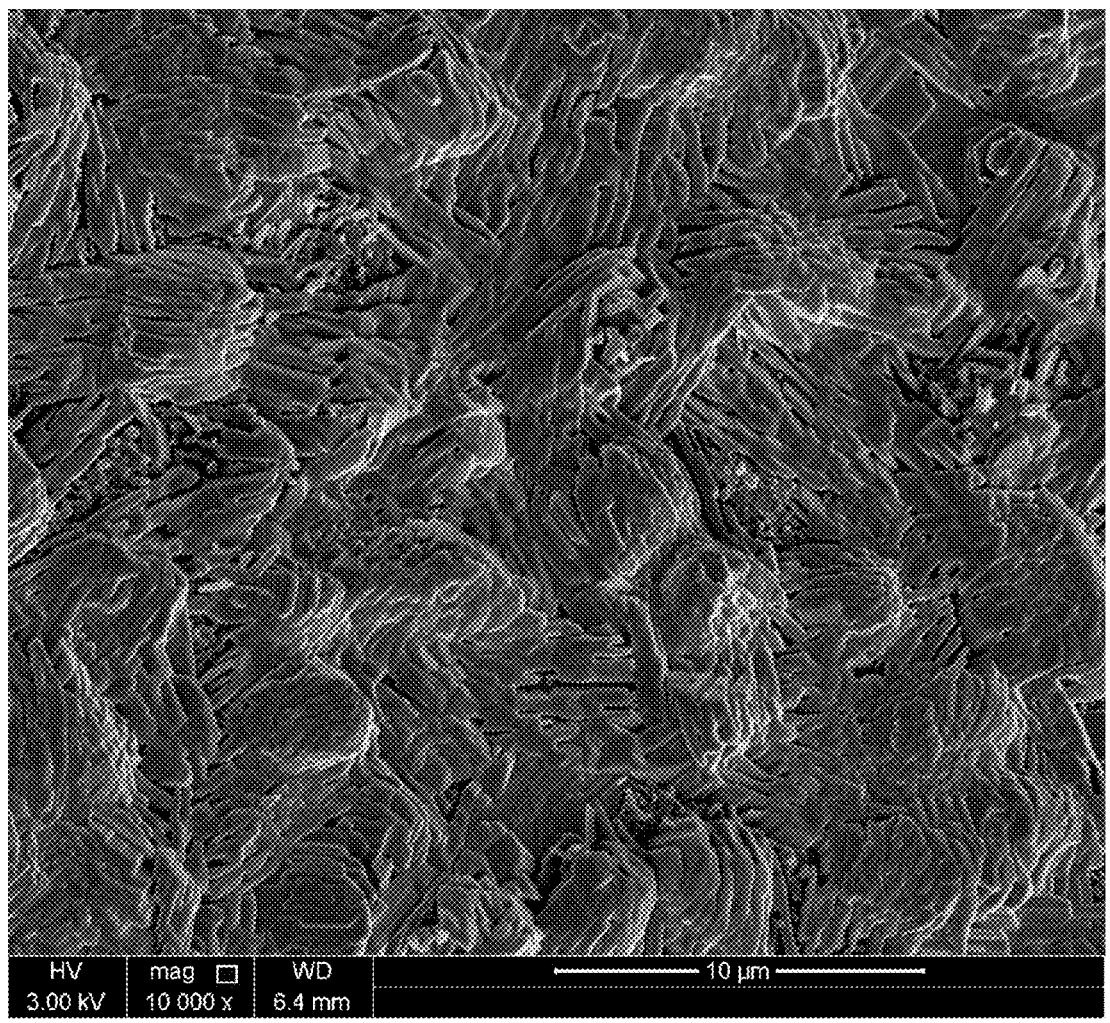
Figure 6F:
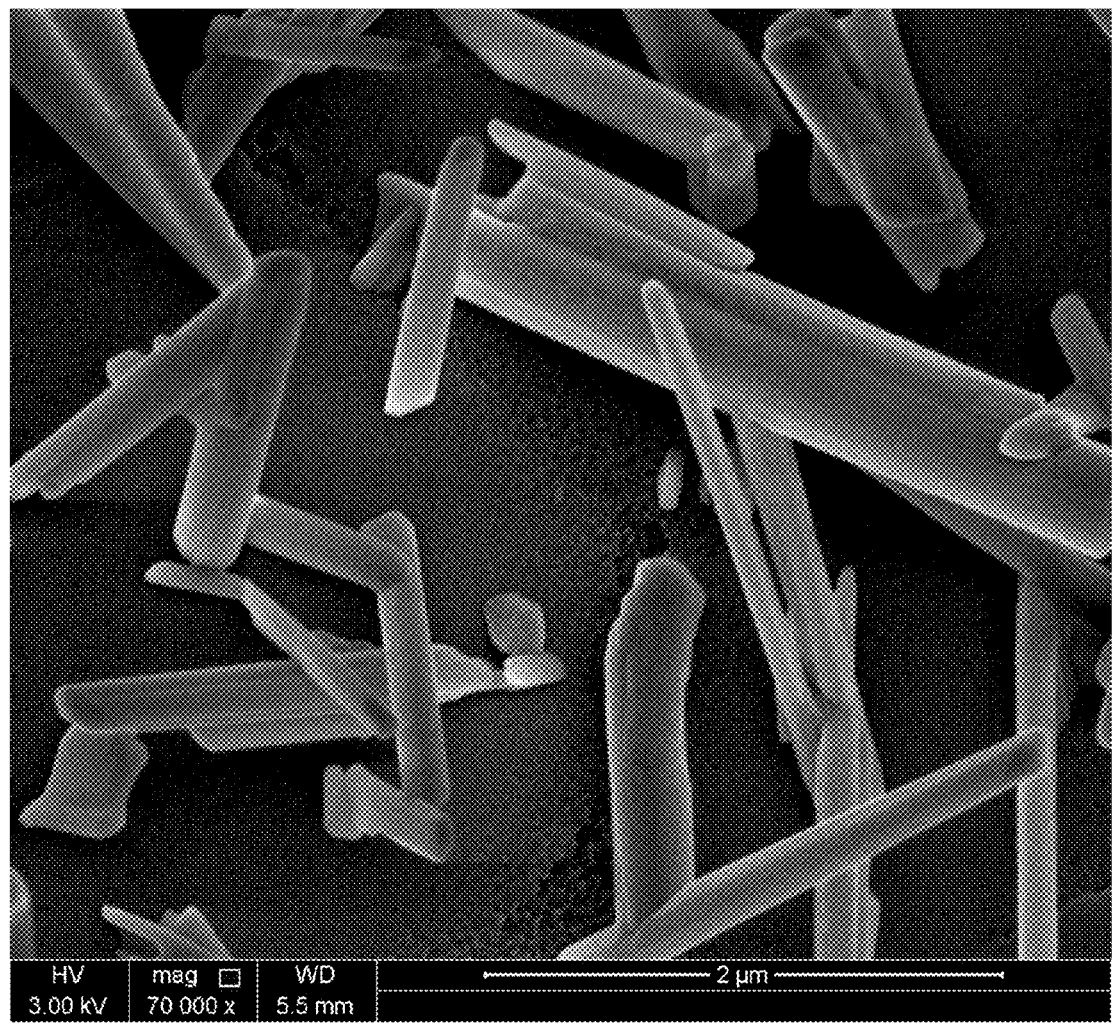

Certain characteristic nanostructures start to appear clearly after the carbonization process in what seems to constitute a fetal stage for the formation of CNRs or CNWs. It is noteworthy that the nanoscale feature in this fetal stage is different and unique for each condition. Examples of nanoscale characteristic shapes in this fetal stage include hedgehog-prickly-like features (e.g., as shown in FIGS. 5A and 5B), palm-frond-like features (e.g., FIGS. 5C and 5D), octopus-hand-like features (e.g., FIGS. 5E and 5F), bacterial-shaped features (e.g., FIGS. 5G and 5H) and rose-like features (e.g., FIGS. 5I and 5J). Consequently, the first evolution of CNRs (i.e., fetal stage of carbon nanostructures) appears in resorcinol-formaldehyde carbon gels with different nano-feature shapes, depending upon the corresponding specific conditions utilized initially for synthesizing the gel.

FIG. 6 generally illustrates Nano-SEM photomicrographs of resorcinol-formaldehyde activated CNRs after the physical activation process of the carbonized stage presented in FIG. 5. Further, this activation process was applied to resorcinol-formaldehyde carbon gel, which was prepared at different gelation temperatures and fixed other parameters (as shown in FIGS. 6A and 6B), different catalyst concentrations (as shown in FIGS. 6C and 6D), and different concentrations of resorcinol with fixed other parameters (as shown in FIGS. 6E and 6F). It was observed that at all conditions the CNRs appear in a full growth stage for all the photomicrographs presented in FIGS. 6A-6F.

Therefore, it is clear that the full growth of CNRs evolves after the physical activation process of carbonized cross-linked gel in which the preceding fetal stage of carbonized nanorods (in the carbon gel) further advances to the formation of fully growing CNRs (in the activated carbon gel).

In sum, the inventors have developed a novel process of forming CNRs and CNWs through resorcinol/formaldehyde gel as a precursor, and the CNRs and CNWs are characterized by unique length and diameters that can be controlled through the optimization of the synthesis conditions. Additionally, the process is easy to handle, achieves high purity of the produced CNRs, and provides controllability of the size of the carbon nanorods. Moreover, this method solves the problem of mass production of CNRs because CNRs are commonly obtained as a byproduct in low yield during the synthesis of CNTs. Importantly, the method is feasible for producing CNRs and CNWs on a commercial scale.

The dimensions of nanoparticles, located between those of molecules and conventional microelectronics, allow mimicking of nature's efficient ways of managing with less when it comes to chemical and physical processing. Therefore, the CNRs and CNWs of the invention may have wide applications in various fields such as catalysts, medicine and pharmaceuticals, biomaterials, electronic devices, nanoelectronics, nanophotonics, ceramic materials, pigments and cosmetics industry.

It is to be understood that the present invention is not limited to the embodiments described above, but encompasses any and all embodiments within the scope of the following claims.

We claim:

1. A method of synthesizing carbon nanorods, comprising the steps of:
   (a) providing resorcinol/formaldehyde gel samples inside a furnace;
   (b) maintaining the furnace at room temperature while continuously purging the furnace with an inert gas;
   (c) heating the furnace up to a temperature of 500° C. and maintaining the temperature at 500° C. for about 3 hours while continuously purging the furnace with the inert gas, thereby producing a carbon gel;
   (d) cooling the furnace down to room temperature;
   (e) flowing $CO_2$ gas into the furnace;
   (f) heating the carbon gel up to 700° C. and maintaining the temperature at 700° C. for at least an 1 hour while continuously flowing $CO_2$ gas, thereby activating the carbon gel and completing formation of carbon nanorods.

2. The method of synthesizing carbon nanorods according to claim 1, further comprising the step of cooling down the activated carbon gel to room temperature after step (f).

3. The method of synthesizing carbon nanorods according to claim 1, wherein during step (c) heating occurs at a rate of 5° C. per minute.

4. The method of synthesizing carbon nanorods according to claim 1, wherein the flow rate of $CO_2$ gas is about 150 $cm^3$/min.

5. The method of synthesizing carbon nanorods according to claim 1, wherein during step (f) heating occurs at a rate of 7° C. per minute.

6. The method of synthesizing carbon nanorods according to claim 1, wherein the inert gas is nitrogen.

7. The method of synthesizing carbon nanorods according to claim 1, wherein the sample is placed in a ceramic boat.

8. The method of synthesizing carbon nanorods according to claim 1, wherein the furnace is a programmable electric-heated tube furnace.

9. Carbon nanorods obtained by the process of claim 1 having a cylinder structure and an average diameter of 140 nm to 127 nm and having an average length between 0.61 microns and 10.6 microns.

10. Carbon nanorods obtained by the process of claim 1 having a cylinder structure and an average diameter of 150 nm and having an average length between 0.61 microns and 10.6 microns.

11. A method of synthesizing carbon nanorods, comprising the steps of:
   synthesizing a resorcinol-formaldehyde gel using sodium carbonate as a catalyst;
   curing the resorcinol-formaldehyde gel at a temperature between 40° C. and 100° C.; and
   heating the resorcinol-formaldehyde gel at a temperature of about 500° C. under flow of nitrogen gas for about three hours to carbonize the resorcinol-formaldehyde gel and begin formation of carbon nanorods.

12. The method of synthesizing carbon nanorods according to claim 11, further comprising the step of heating the carbonized resorcinol-formaldehyde gel at a temperature of about 700° C. under flow of carbon dioxide gas for about one hour to activate the carbonized resorcinol-formaldehyde gel and complete formation of the carbon nanorods.

13. The method of synthesizing carbon nanorods according to claim 12, further comprising the step of adjusting a parameter selected from the group consisting of concentration of resorcinol, concentration of sodium carbonate catalyst, and curing temperature in order to control length and diameter of the carbon nanorods produced.

14. The method of synthesizing carbon nanorods according to claim 12, further comprising the step of covering the resorcinol-formaldehyde gel with acetic acid after crosslinking in order to prevent dehydration of the crosslinked gel.

15. The method of synthesizing carbon nanorods according to claim 14, further comprising the step of exchanging supernatant fluid above the crosslinked gel with acetone on three consecutive days after curing the crosslinked gel.

16. The method of synthesizing carbon nanorods according to claim 14, further comprising the step of incubating the crosslinked gel for two days at 50° C. after said exchanging step in order to dry the crosslinked gel.

* * * * *